United States Patent [19]
Niki et al.

[11] Patent Number: 4,879,595
[45] Date of Patent: Nov. 7, 1989

[54] TECHNIQUE FOR REPRODUCING AN IMAGE READ FROM A COLOR ORIGINAL

[75] Inventors: Hiroshi Niki, Hachioji; Masahiko Matsunawa, Fussa; Hiroyuki Yamamoto, Yokohama; Yoshinori Abe, Hino, all of Japan

[73] Assignee: Konishiroku Photo Industry Co., Ltd., Tokyo, Japan

[21] Appl. No.: 921,324

[22] Filed: Oct. 17, 1986

[30] Foreign Application Priority Data

| Oct. 22, 1985 | [JP] | Japan | 60-236767 |
| Dec. 26, 1985 | [JP] | Japan | 60-294891 |
| Dec. 26, 1985 | [JP] | Japan | 60-294893 |
| Dec. 26, 1985 | [JP] | Japan | 60-294895 |
| Dec. 26, 1985 | [JP] | Japan | 60-294898 |
| Dec. 26, 1985 | [JP] | Japan | 60-294900 |

[51] Int. Cl.$^4$ ............ G03F 3/08; H04N 1/46
[52] U.S. Cl. .................. 358/80; 358/75
[58] Field of Search .......... 358/75, 15, 78, 80

[56] References Cited

U.S. PATENT DOCUMENTS

| 4,261,011 | 4/1981 | Knop | 358/75 |
| 4,307,415 | 12/1981 | Sundermeyer et al. | 358/80 |
| 4,323,919 | 4/1982 | Fujii et al. | 358/75 |
| 4,479,242 | 10/1984 | Kurata | 358/75 |
| 4,517,589 | 5/1985 | Baba et al. | 358/75 |
| 4,517,590 | 5/1985 | Nagashima et al. | 358/75 |
| 4,538,182 | 8/1985 | Saito et al. | 358/80 |
| 4,577,218 | 3/1986 | Kurata | 358/75 |
| 4,642,681 | 2/1987 | Ikeda | 358/75 |
| 4,663,662 | 5/1987 | Sekizawa et al. | 358/75 |
| 4,667,228 | 5/1987 | Kawamura et al. | 358/80 |
| 4,694,502 | 9/1987 | Ozawa et al. | 358/80 |
| 4,734,782 | 3/1988 | Maeshima | 358/280 |

FOREIGN PATENT DOCUMENTS

| 2444288 | 7/1980 | France |  |
| 50-62320 | 5/1975 | Japan |  |
| 53-8159 | 1/1978 | Japan | 358/75 |
| 55-117379 | 9/1980 | Japan | 358/75 |
| 57-44825 | 3/1982 | Japan | 358/75 |
| 59-36478 | 2/1984 | Japan | 358/75 |
| 59-99438 | 6/1984 | Japan | 358/75 |
| 60-143061 | 7/1985 | Japan | 358/75 |

OTHER PUBLICATIONS

Patent Abstracts of Japan, vol. 6, No. 116 (P-125), [994], Jun. 29, 1982, [Japanese Kokai 57-44825, Kuwayama].
Patent Abstracts of Japan, vol. 9, No. 49 (E-300), [1772], Mar. 2, 1985, [Japanese Kokai 59-189780, Maejima].
"1107 Report", Preprints for the 1982 *Conference of the Electric and Communication Institute of Japan*.

Primary Examiner—James J. Groody
Assistant Examiner—Randall S. Svihla
Attorney, Agent, or Firm—Frishauf, Holtz, Goodman & Woodward

[57] ABSTRACT

A color image processing technique using optics to separate an original color image into a plurality of colors. These colors are photoelectrically converted to electric signals. Color information signals are then generated from these electric signals. The color information signals are coded by comparing them with a threshold value. An individualized set of such threshold values is provided for each of the plurality of colors. In one embodiment, a luminance signal is provided from the color information signals. The luminance signal is utilized in response to a monochrome code selection signal to enable the original color image to be reproduced as a monochrome image. Color gamut information and color density information of the color gamut can be obtained from the color information signals during a first scan of a document bearing the color image.

19 Claims, 35 Drawing Sheets

PRIOR ART
FIG. 4-a
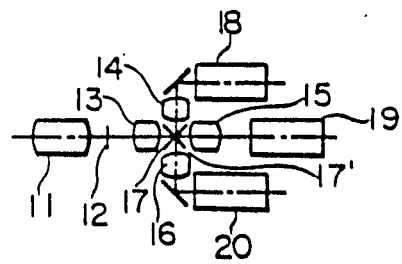
PRIOR ART
FIG. 4-b
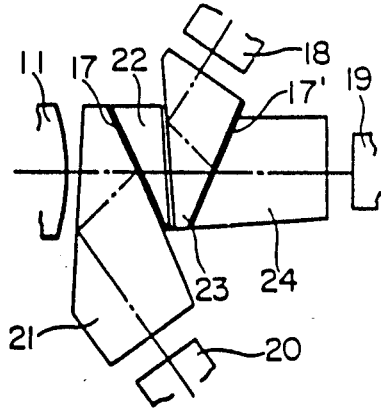
PRIOR ART
FIG. 4-c
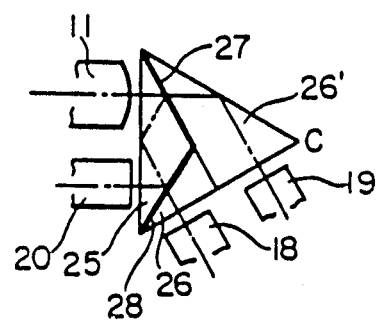
PRIOR ART
FIG. 4-d
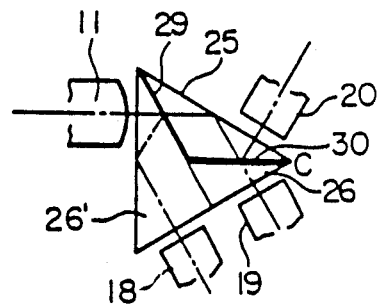
PRIOR ART
FIG. 4-e
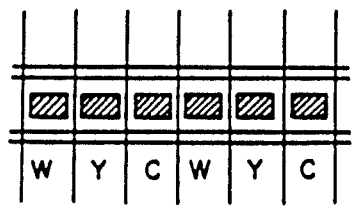

PRIOR ART
FIG. 4-f
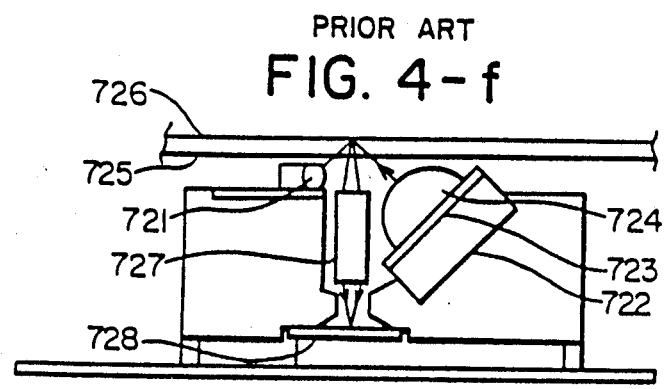
PRIOR ART
FIG. 4-g
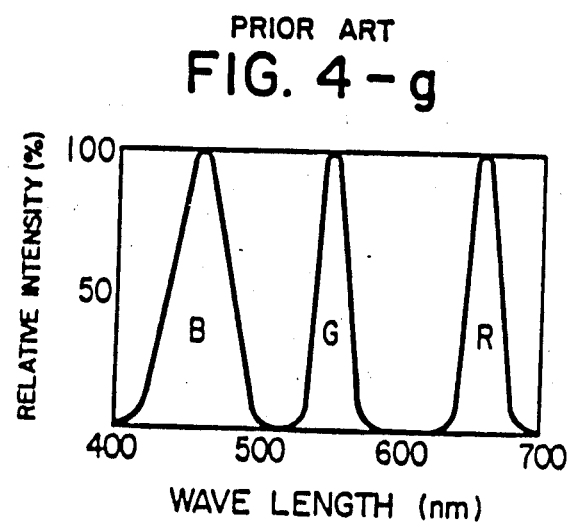
PRIOR ART
FIG. 4-h
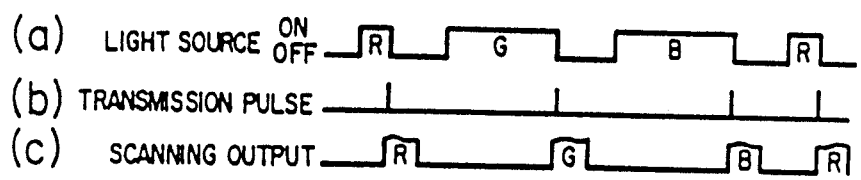

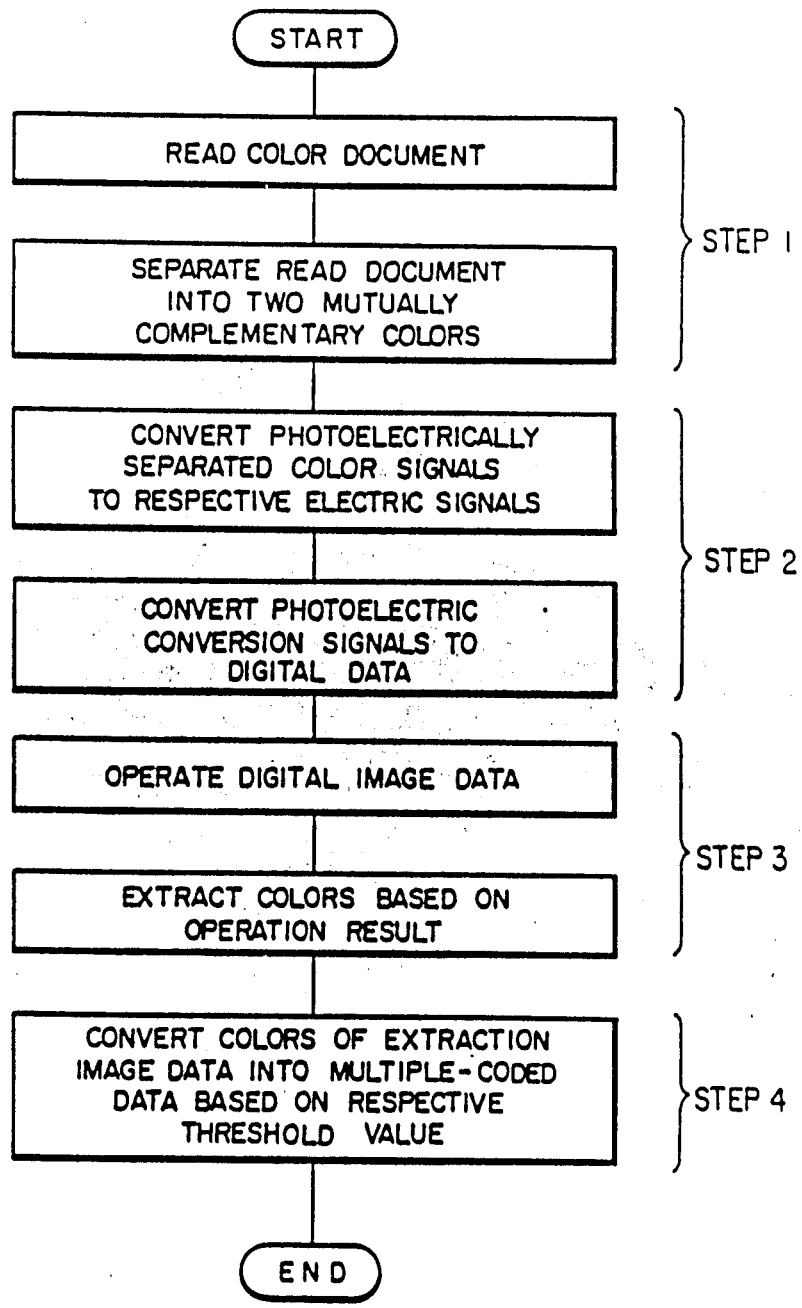

FIG. 6-a
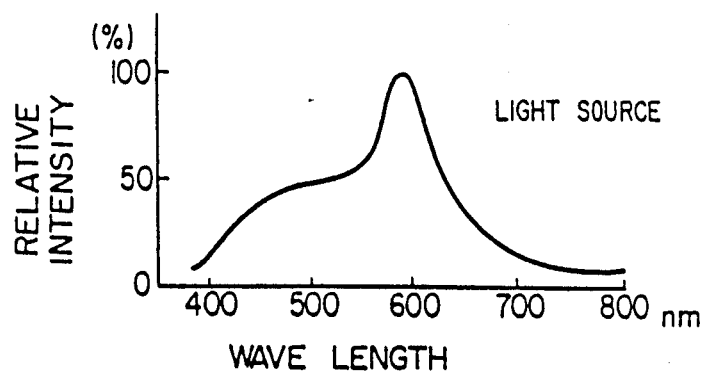
FIG. 6-b
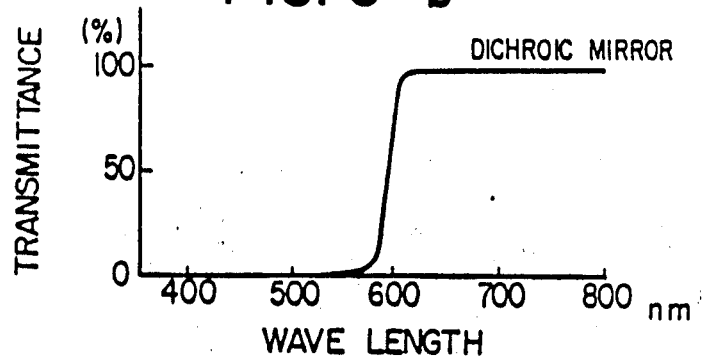
FIG. 6-c
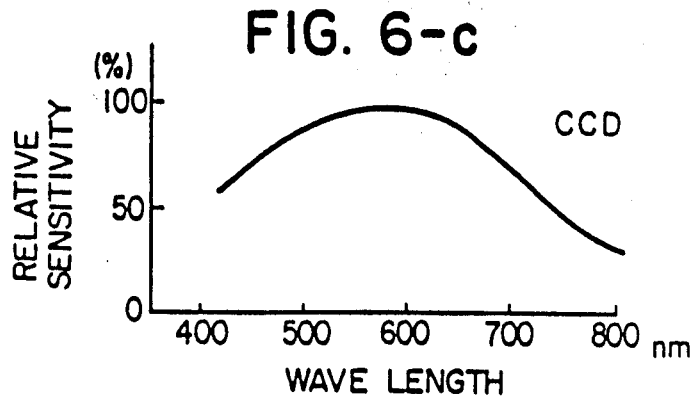

FIG. 7
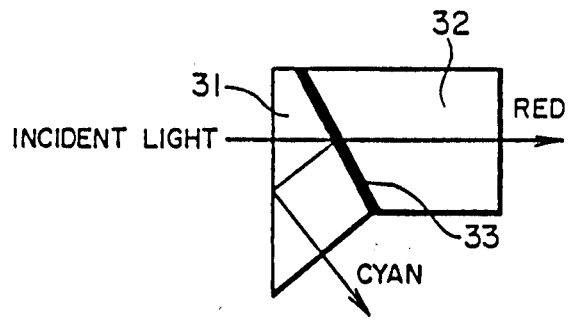
FIG. 8-b
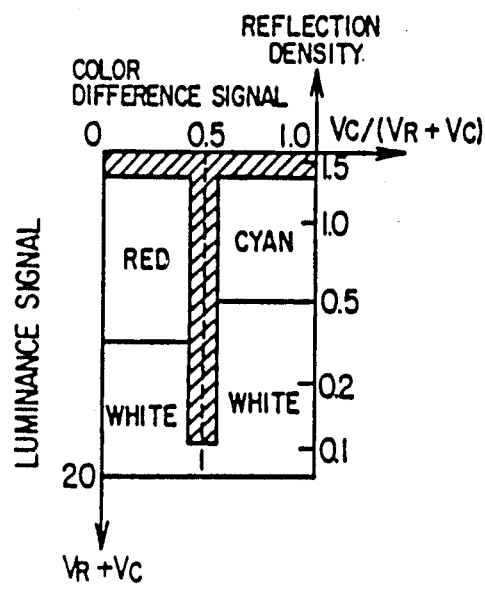
FIG. 8-a
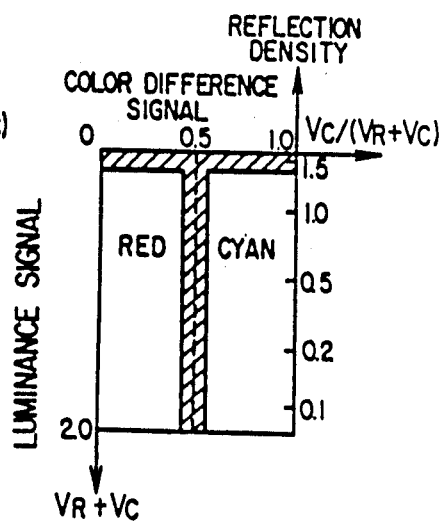

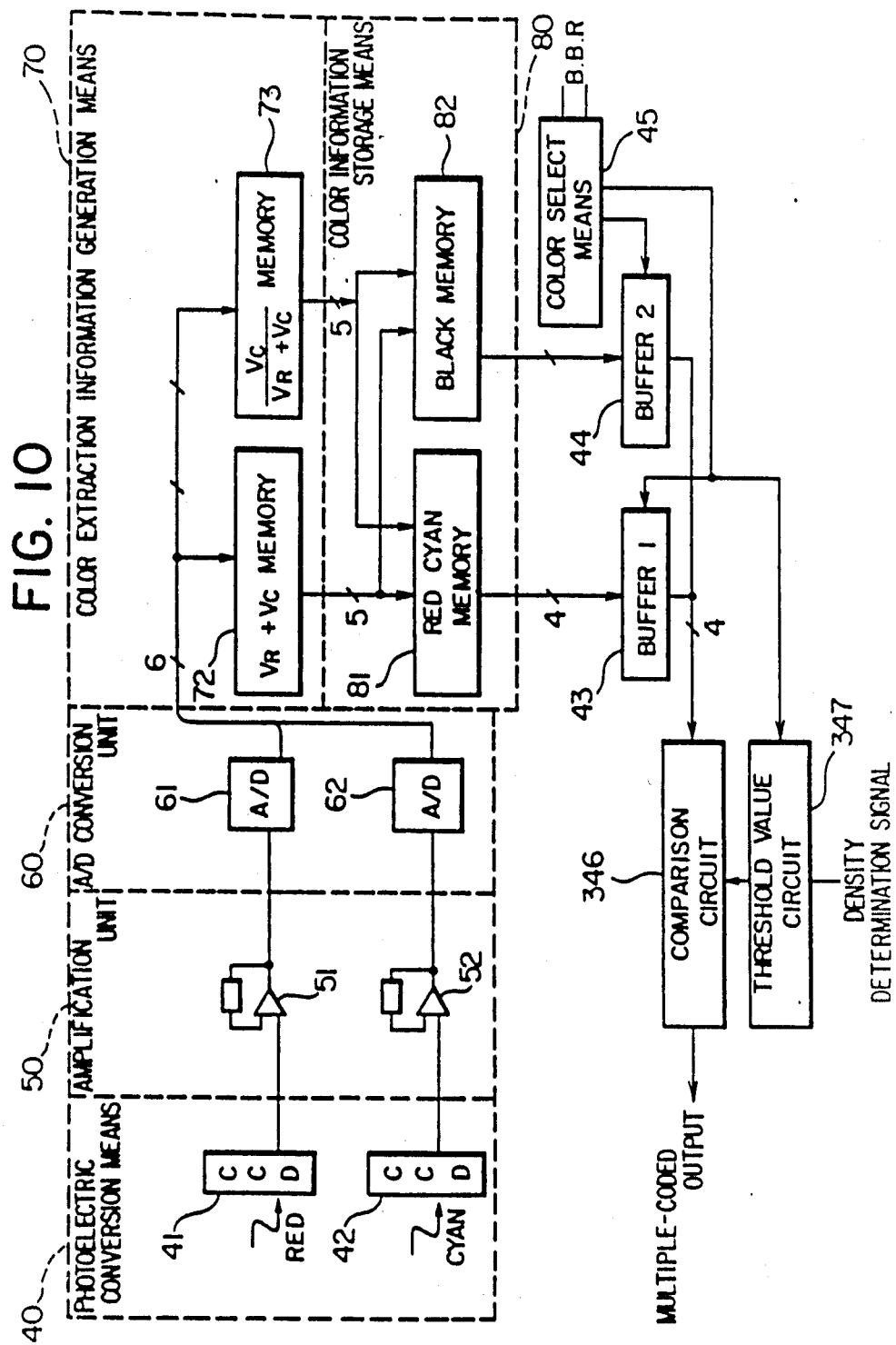

FIG. 11-a
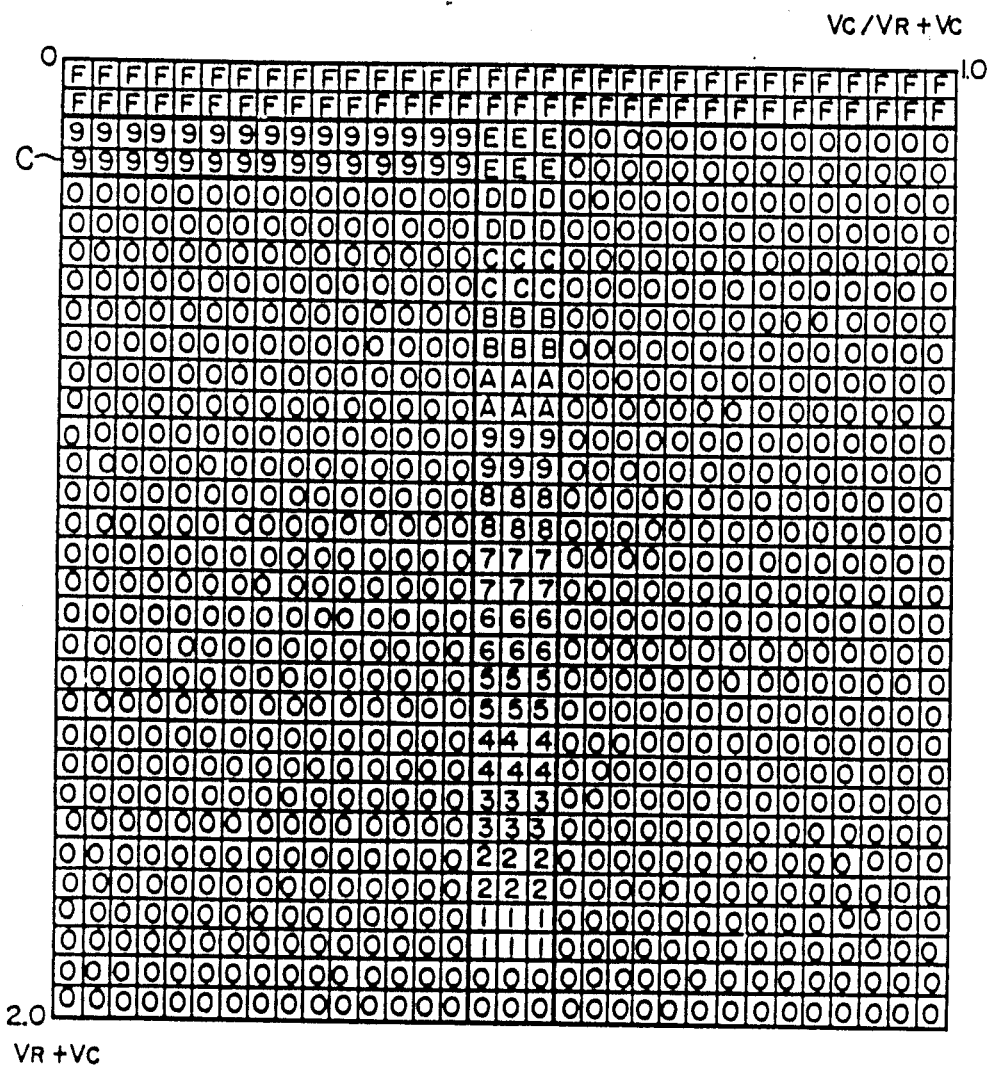

FIG. 11-b
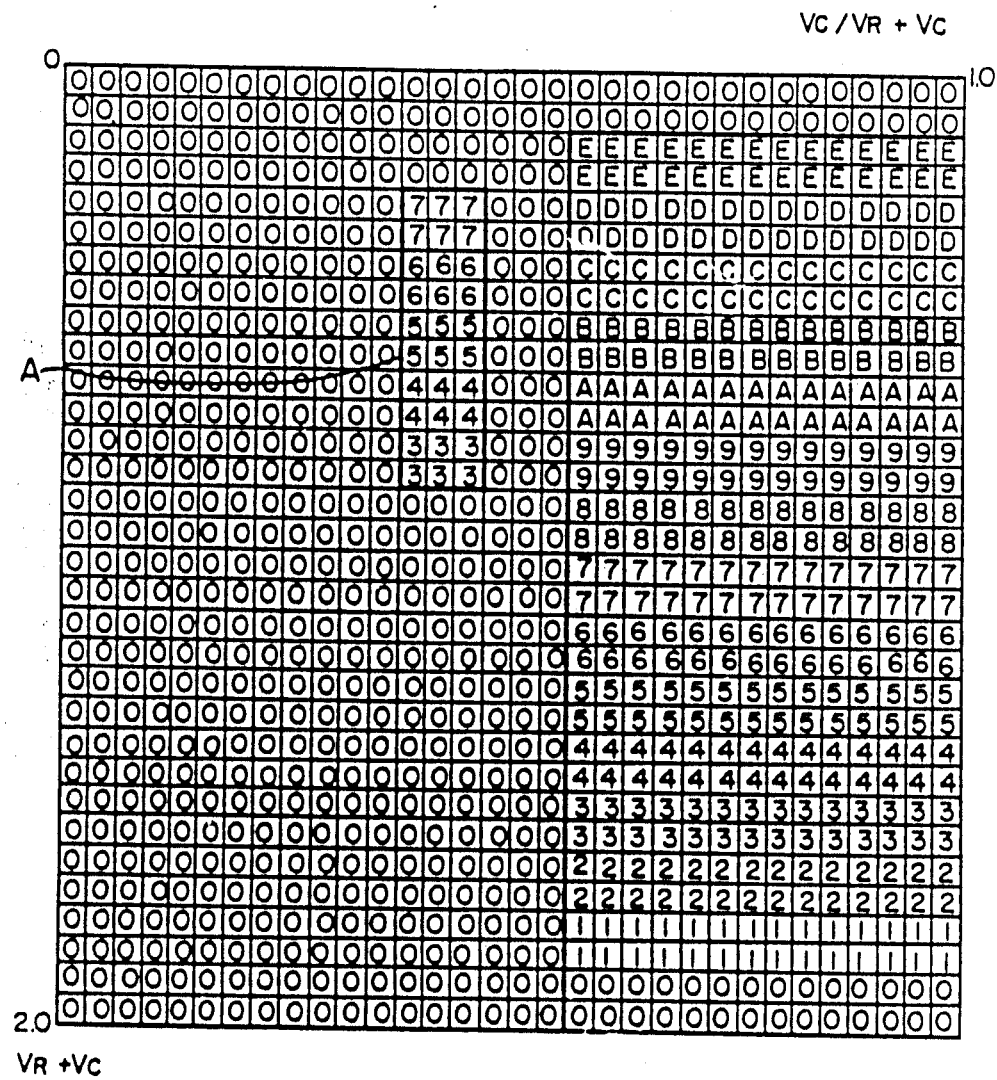

FIG. 11-c
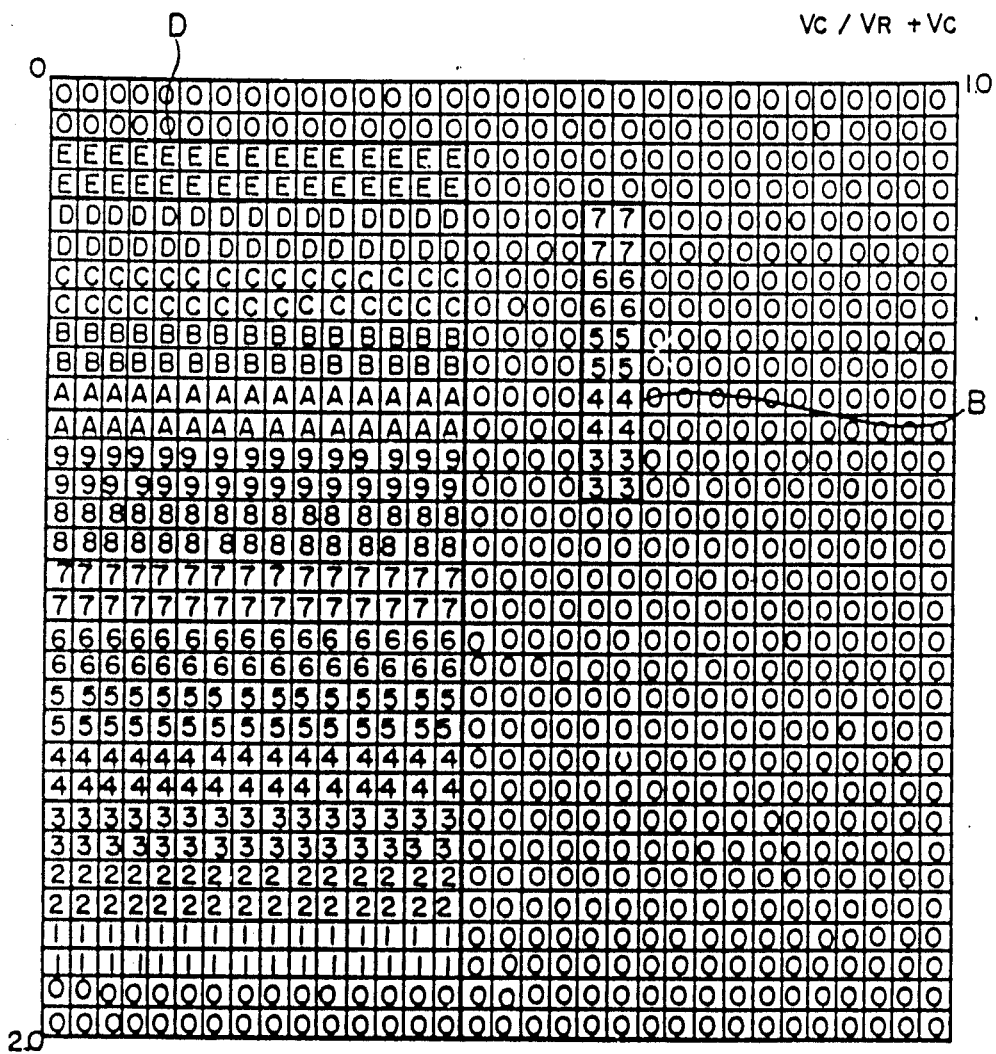

| B.B.R | DESIGNATION COLOR |
|---|---|
| 1 0 | RED |
| 0 1 | BLUE |
| 0 0 | BLACK |
| 1 1 | MONOCHROME |

| B.B.R | | | | | COLOR |
|---|---|---|---|---|---|
| D0 | D1 | E | F | G | |
| 0 | 0 | 0 | 1 | 1 | BLACK |
| 1 | 0 | 1 | 0 | 1 | RED |
| 0 | 1 | 1 | 0 | 1 | BLUE |
| 1 | 1 | 1 | 1 | 0 | MONOCHROME |

| B.B.R | 2 | 3 | CLK | COLOR | DENSITY |
|---|---|---|---|---|---|
| 0 0 | 0 | 0 |  | BLACK | LOW |
|  | 0 | 1 | 00 ~ 11 |  | REGULAR |
|  | 1 | 0 |  |  | HIGH |
| 0 1 | 0 | 0 |  | BLUE | LOW |
|  | 0 | 1 | 00 ~ 11 |  | REGULAR |
|  | 1 | 0 |  |  | HIGH |
| 1 0 | 0 | 0 |  | RED | LOW |
|  | 0 | 1 | 00 ~ 11 |  | REGULAR |
|  | 1 | 0 |  |  | HIGH |
| 1 1 | 0 | 0 |  | MONOCHROME | LOW |
|  | 0 | 1 | 00 ~ 11 |  | REGULAR |
|  | 1 | 0 |  |  | LIGH |

FIG. 21-a
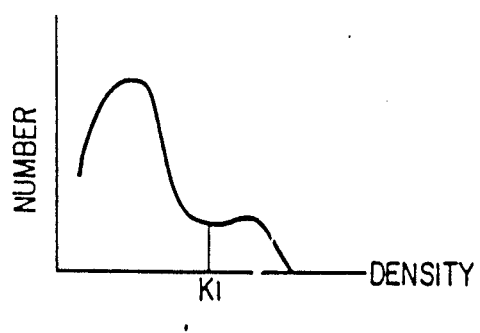
FIG. 21-b
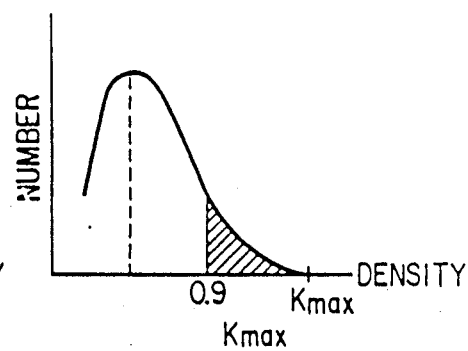
FIG. 25
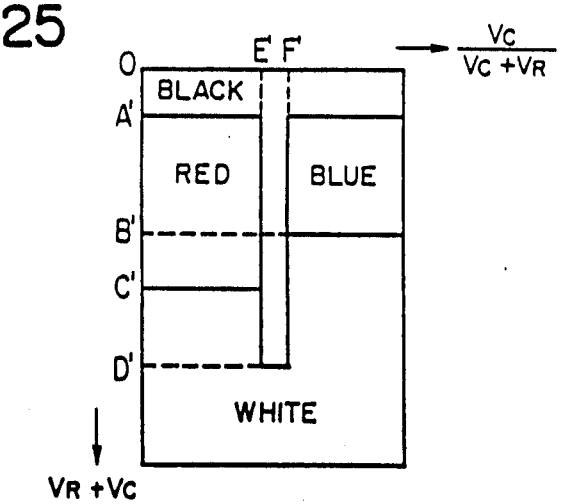
FIG. 26-a  READING |————| |————|
FIG. 26-b  COLOR DISCRIMINATION |————BLACK/RED————|
FIG. 26-c  B.B.R |———BLACK———| |———RED———|
FIG. 26-d  RECORDING (WRITING) |———BLACK———| |———RED———|

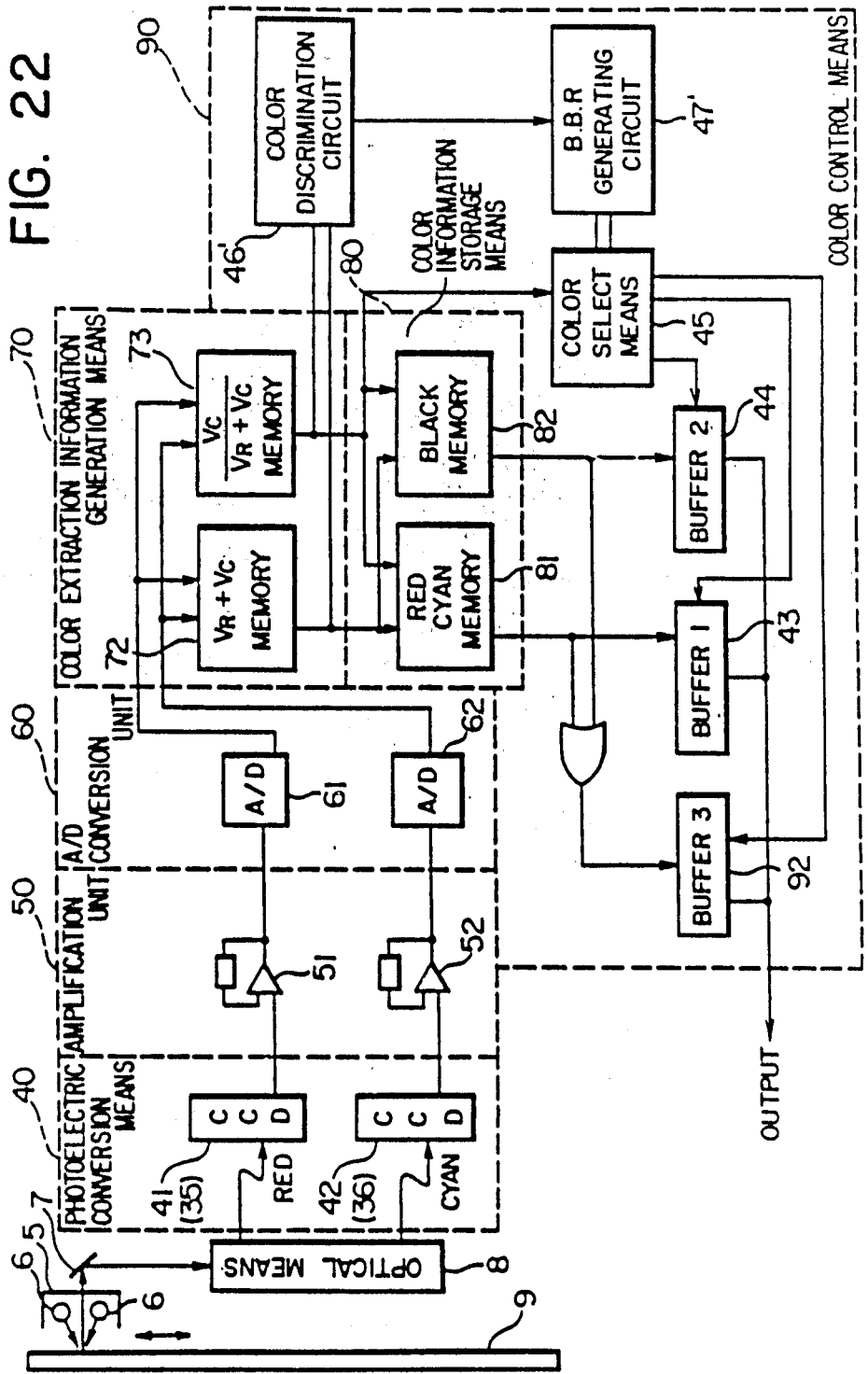

FIG. 27

| B.B.R | 2 | 3 | CLK | COLOR | DENSITY | THRESHOLD VALUE MATRIX GROUP | THRESHOLD VALUE MATRIX |
|---|---|---|---|---|---|---|---|
| 0 0 | 0 | 0 | 00~11 | BLACK | LOW | A0 ~ 2 | A0 |
|  | 0 | 1 |  |  | REGULAR |  | A1 |
|  | 1 | 0 |  |  | HIGH |  | B2 |
| 0 1 | 0 | 0 | 00~11 | BLUE | LOW | B0 ~ 2 | B0 |
|  | 0 | 1 |  |  | REGULAR |  | B1 |
|  | 1 | 0 |  |  | HIGH |  | B2 |
| 1 0 | 0 | 0 | 00~11 | RED | LOW | C0 ~ 2 | C0 |
|  | 0 | 1 |  |  | REGULAR |  | C1 |
|  | 1 | 0 |  |  | HIGH |  | C2 |
| 1 1 | 0 | 0 | 00~11 | MONOCHROME | LOW | D0 ~ 2 | D0 |
|  | 0 | 1 |  |  | REGULAR |  | D1 |
|  | 1 | 0 |  |  | HIGH |  | D2 |

FIG. 42
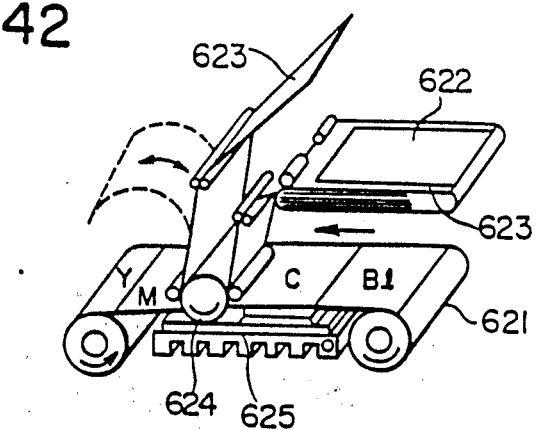
FIG. 43
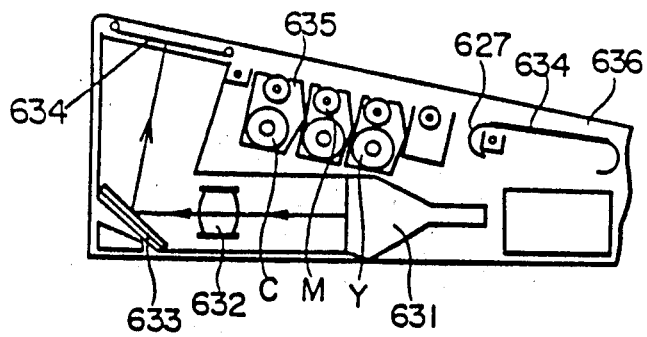
FIG. 44
FIG. 45
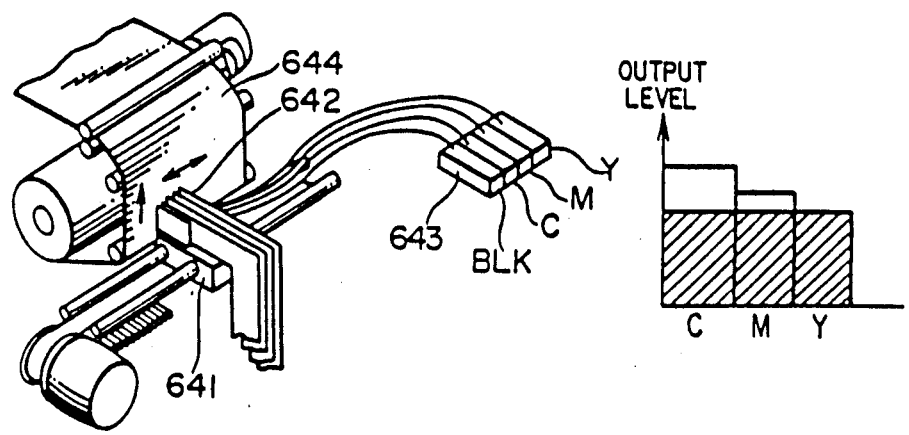

TECHNIQUE FOR REPRODUCING AN IMAGE READ FROM A COLOR ORIGINAL

BACKGROUND OF THE INVENTION

The present invention relates to color image processing methods and apparatus that extract colors from color images. More specifically, the present invention relates to color image processing methods and apparatus that can extract achromatic colors in addition to two kinds of colors.

Various prior art techniques are well known to read a color document by means of a scanner and to extract colors from the color image which has been read.

(1) A first method

As illustrated in FIG. 1, this method employs a red light source 2 and a blue light source 3 to illuminate a color document 1. A photoelectrical conversion means 4, like a CCD, receives respective optical information and converts them to electrical signals. Output signals from the photoelectrical conversion means 4 are normalized based on the output value of white color paper, and designated as VR and VB, respectively. These two signals are operated to make a color extraction map. The 1107 report in the preprints for 1982 conference of Japan Electric & Communication Institute describes a color extraction map shown in FIG. 2, and suggests that a plurality of colors may be extracted based on this color extraction map. The abscissa axis of FIG. 2 is normalized output (%) from the photoelectrical conversion means 4 when the red light source is on. The ordinate axis is normalized output (%) from the photoelectrical conversion means 4 when the blue light source is on.

(2) A second method

This method employs two types of light detection means whose spectral sensitivities are different for one picture element. The outputs VA and VB from the light detection means are operated to extract colors. This method is disclosed in Kakai No. 57-44825. For example, the light detection means detects for the vertical luminance signal axis (VA+VB):

$VA + VB \geq a1$  is white,
$a2 < VA + VB < a1$  is chromatic color,
$VA + VB \leq a2$  is black; and and for the transverse hue signal axis (log VA − log VB):

$\log VA - \log VB \geq b1$  is red
$b2 < \log VA - \log VB < b1$  is green,
$\log VA - \log VB \leq b2$  is blue.

Where a1, a2, b1, and b2 are constants, respectively. FIG. 3 is a color extraction map obtained by this method.

(3) A third method

This method employs a plurality of dichroic mirrors, prisms, or R-, G-, B-filters to separate optical information into three colors of red, green, and blue. This method is disclosed in Japanese Patent Laying-Open Gazette (Kokai) No. 62320/1975.

FIGS. 4a–4h illustrates various methods to separate colors. The apparatus shown in FIG. 4-a is arranged so that colors on an aerial image 12 formed by a photographic lens 11 are separated into three colors by means of a plurality of relay lenses 13 through 16 and dichroic mirrors 17 and 17', and each color image is formed on a plurality of camera tubes 18 through 20, respectively. In the apparatus shown in FIG. 4-b, a plurality of specific shaped prisms 21 through 24 are arranged between the photographic lens 11 and the camera tubes 18 through 20, and the dichroic mirrors 17 and 17' and inserted, respectively, between the prisms 21 and 22, and between prisms 23 and 24, so that a color image through the photographic lens 11 is separated into three colors.

In the apparatus shown in FIG. 4-c, three prisms 25, 26, and 26' whose apex angles are an acute angle are brought together and the dichroic mirrors 27 and 28 are inserted between each prism to separate a color image into three colors. In the apparatus shown in FIG. 4-d, the prisms shown in FIG. 4-c are inverted. Dichroic mirrors 29 and 30 are formed at boundaries between each prism.

The above described conventional image processing methods and apparatus can provide means to separate colors. However, techniques for how to utilize the separated colors are still under development.

In view of the above described status and disadvantages of conventional image processing methods and apparatus, it is an object of the present invention to provide an image processing method and apparatus that can output well-balanced images.

The following are well-known as image processing methods which detect and output images having more than three colors.

(a) This method separates colored light from the input image into three elementary colors, R (red), G (green), and B (blue), according to the three-elementary color principle, and detects each light intensity by means of CCD image sensors or the like to obtain a color image. This method corresponds to the third method described above, and shown in FIG. 4-a to 4-d.

(b) This method employs a plurality of light detection devices, each of which is equipped with color filters of R, G, and B, or Y (yellow), M (Magenta), and C (cyan), or W (white), Y (yellow), and C (cyan), or G (green), Y (yellow), and C (cyan), and provides the thus obtained outputs to detect color images.

FIG. 4-e illustrates an example of arranging color filters employed in method (b). As illustrated in this figure, a plurality of color filters are arranged in this order of W (white), Y (yellow), and C (cyan), repeatedly. A photoelectric conversion element is provided on the central portion of each filter as illustrated by diagonal lines in the figure. All light passing through each filter is converted into electrical signals. These conventional methods (a) and (b) require light detection devices that have different spectral sensitivities for each picture element on the color document. Therefore, method (b) has the disadvantages discussed below.

(1) The thickness dispersions or uneven thickness of each color filter cause the dispersions of output sensitivities from the photoelectric conversion elements to increase. Therefore, the yield of the photoelectric conversion elements during manufacturing decreases.

(2) A lot of light receiving portions (number of picture elements) are needed to make images with high resolution of every color. The number of picture elements in the ready made, reduction optical system that employs a photoelectric conversion element covered with a filter may be substantially reduced and cannot satisfy the requirements described above. Therefore, a plurality of photoelectric conversion elements are required, thereby increasing complexity of the control operation. On the other hand, two methods are possible to satisfy the requirements described above by an equi-magnification optical system. One is to employ a configuration comprising a plurality of CCD chips. But joining each chip in this configuration is difficult and another process is required to obtain serial image.

The other is to use materials of a-Si or CdS-CdSe family. This method has the disadvantage of a low image formation speed.

Method (a) requires a plurality of image formation elements to provide high speed image formation. The image formation system, however, is very expensive and requires a lot of man-hours to be aligned. An image formation system that employs a single light detection device and a plurality of color light emitting sources is developed as one attempt to resolve these disadvantages. FIG. 4-f illustrates one example for configuring the image formation system. In this figure, 721 is a red/green light source LED;
722, a blue fluorescent panel;
723, an orthochromatic filter; and
724, a cylindrical lens.

The reason why a blue fluorescent panel is used as a blue light source in place of an LED is that a blue LED with high efficiency is not available at present. FIG. 4-g shows a spectra example of the light emitting source employed in FIG. 4-f. The abscissa axis represents the wave length (nm), and the ordinate axis represents the relative intensity (%). R represents the spectrum of the red LED 721; G, the spectrum of the green LED 721; and B, the spectrum of the blue fluorescence panel.

These light sources sequentially emit light in accordance with the timing diagram shown in FIG. 4-h (a), and illuminates a document 726 placed on a glass plate 725. The reflected light from the document 726 enters into a SELFOC lens 727, passes through the lens, and is converted to electrical signals by a CCD sensor 728. When the optical information is converted to an electrical signal by the CCD sensor 728, a transmission pulse is outputted as shown in FIG. 4-h (b). As illustrated in FIG. 4-h (c), electrical charges in the CCD are taken out as a scanning output. As described above, color signals are obtained by using an apparatus shown in FIG. 4-f, lighting three color light sources of R, G, and B during the scanning of a line, followed by arithmetic processing. This image forming system provides a small-sized color image processing apparatus with low manufacturing costs. The apparatus, however, has disadvantages of a complicated image forming system, and speeding up the image formation is difficult.

In view of the foregoing, it is an object of the present invention to provide an image processing apparatus which has a relatively simple configuration and ensures a high speed image formation. More specifically, it is an object to provide an image processing apparatus which can separate colors easily. In order to copy, with sufficient density, the colored portion of red, blue, and the like on the color document, the developed portion is constituted so that the bias voltage can be controlled in a conventional monochrome, analog copying machine. For example, during normal development, the developed bias voltage is lowered to ground potential for a document of orange or light blue, which has a low reflection density, in order to improve the development ability of such color and to effect sufficient copy density. On the other hand, to obtain sufficient copy density of a document written with blue writing utensils (for example, a ball point pen), writing utensil manufacturers mix a small quantity of carbon black into the ink. When the document is written with black-, blue-, and red-series writing utensils at the same time, some red characters cannot be copied with sufficient density even though black and blue characters are copied with sufficient density. This problem is caused by the different reflection density due to the differences of colors. Therefore, in a digital copying machine which processes image information by photoelectric conversion and digital conversion, it may be preferred to apply a threshold value having different values corresponding to respective color ranges of colors to be reproduced so that every color image can be copied with sufficient density.

SUMMARY OF THE INVENTION

One aspect of the invention to resolve the above described problems is characterized in that color information read from a document is separated into colors of more than two kinds, the separated color information is photoelectrically converted to electric signals, the photoelectrically converted signals are processed by predetermined arithmetic processing steps, color gamuts of the color information are detected based on the operated signals, image data per each color gamut corresponding to color ranges are outputted, and a plurality of threshold values per each color gamut are set during multiple-coding of the above image data. Another aspect of the invention comprises an optical means which separates the color information from a document into at least two kinds of colors, a photoelectric conversion means which converts the optical signals from the optical means into electric signals, an arithmetic process means which processes the output from the photoelectrical conversion means with predetermined arithmetical processing steps, and a multiple-coding means which multiple-codes the image data based on the results obtained with the arithmetic process means by setting a plurality of isolated threshold values per each color gamut.

BRIEF DESCRIPTION OF THE DRAWING

FIGS. 4-a to 4-h are structural views of the conventional color separation optical system and one example of output signal therefrom;

FIG. 5 is a flowchart showing one example of the present invention;

FIGS. 6-a to 6-c are diagrams showing the spectral characteristics of a light source, a dichroic mirror and CCD used in the present invention;

FIG. 7 is a structural view of one example of optical means used in the present invention;

FIGS. 8-a and 8-b are diagrams showing an example of the color extraction map in accordance with the present invention;

FIG. 10 is a structural block diagram showing one embodiment of the apparatus of the present invention;

FIGS. 11-a to 11-c are diagrams showing another example of ROM table;

FIGS. 19-a to 19-b are diagrams showing examples of storing a threshold value in ROM;

FIGS. 21-a and 21-c are diagrams showing examples of a density histogram;

FIG. 22 is a structural block diagram showing one embodiment of the apparatus comprising a control means;

FIG. 25 is a diagram showing an example of color extraction map for the color discriminating circuit;

FIGS. 26a–26d are timing charts showing a color discrimination operation;

FIG. 27 is a table showing the relation between input terminal of threshold value ROM, color density and threshold value matrix;

FIGS. 41, 42, 43 and 44 are structural views illustrating configurations of output apparatus;

FIG. 45 is a diagram showing an output level.

DETAILED DESCRIPTION OF THE INVENTION

Figure 1:
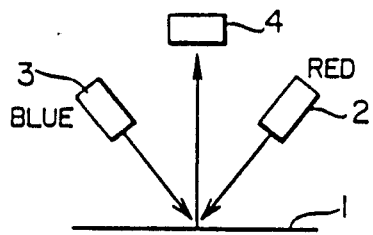
FIG. 1 is a schematic view of the concept of a color separation optical system.

FIG. 5 is a flowchart showing one embodiment of the present invention. Hereinafter, the present invention is described in detail referring to this flowchart.

STEP 1

First, the apparatus reads a color document. To read a color document, the document should be illuminated with a light source such as one having the spectrum shown in FIG. 6-a. In this figure, the abscissa axis represents wave length (nm) and the ordinate axis represents relative intensity (%). When the color document is illuminated with the light source having the spectrum shown in FIG. 6-a, reflected light from the color document enters into an optical means such as the one shown in FIG. 7, and is separated into Red and Cyan components. That is, the reflected light from the color document enters into a prism 31. The cyan series colors involved in the incident light are reflected by a dichroic mirror 33 inserted between the prisms 31 and 32, and exit from the prism 31. On the other hand, the red series colors pass through the dichroic mirror 33 and exit from the prism 32. That is, the dichroic mirror 33 employed in the present invention separates the incident light into two mutually complementary colors. FIG. 6-b is a graph showing the characteristics of the dichroic mirror. In this figure, the abscissa axis represents wave length (nm), and the ordinates axis represents transmittance (%). The graph clearly shows that the red series light of longer wave length is transmitted by the dichroic mirror and the cyan series light of shorter wave length is reflected by the dichroic mirror. The term "two mutually complementary colors" means the relationship between two colors of X and Y, wherein $X+Y=white$.

STEP 2

In this step, the apparatus converts the separated two colors of red and cyan into electrical signals by means of photoelectric conversion elements like CCD. FIG. 6-c is a graph showing the spectral sensitivity of the CCD employed in the present invention. In this figure, the abscissa axis represents wave length (nm), and the ordinate axis represents relative sensitivity (%). As clearly found in the figure, the CCD has a relative sensitivity peak at the wave length of approx. 600 nm. These photoelectric conversion signals are normalized by the output value of the reference color (white). The normalized red and cyan light signals are assumed to be VR and VC, respectively. And these photoelectric conversion signals are again converted into digital data (in this embodiment, 6-bit data) by an A/D conversion unit.

STEP 3

In this step, the apparatus creates a coordinate system according to the digital image data obtained in step 2, and extracts colors based on the created color extraction map. The following are taken into consideration to decide the coordinate system:

(1) The concept of document reflectance (reflection density) that corresponds to luminance signals in TV set, in order that intermediate tones or halftones can be expressed.

(2) The concept of color differences between red, cyan, etc. that include hue and chroma.

Accordingly, the following are used as luminance signal information and color difference signal information:

$$\text{Luminance signal information} = VR + VC \qquad (1)$$

where,
$0 \leq VR \leq 1.0$
$0 \leq VC \leq 1.0$
therefore
$0 \leq VR + VC \leq 2.0$ $VR+VC=0$ corresponds to the black level, and $VR+VC=2.0$ corresponds to the white level. Therefore, every color is within the range of 0 to 2.0.

Color difference signal
information $= VR/(VR+VC)$, or $VC/(VR+VC)$ (2)

If the color is an achromatic color, the ratio of VR or VC components to the summation of (VR+VC) is constant. Therefore, $VR/(VR+VC) \approx VC/(VR+VC) \approx 0.5$ On the other hand, when the color is a chromatic color, the value of $VR/(VR+VC)$ or $VC/(VR+VC)$ can be a scale that represents the hue and chroma of a document.

That is, chromatic colors can be represented as follows:
(1) Red series color
   $0.5 < VR/(VR+VC) \leq 1.0$
   $0 \leq VC/(VR+VC) < 0.5$
(2) Cyan series color
   $0 \leq VR/(VR+VC) < 0.5$
   $0.5 < VC/(VR+VC) \leq 1.0$ Therefore, by using the coordinate system whose two axes are (VR+VC), and VR/(VR+VC) or VC/(VR+VC), it is possible to extract chromatic colors (red and cyan series) and achromatic colors clearly.

FIG. 8-a shows an example of a color extraction map representing color gamuts obtained by the above described color extraction method. In this figure, the abscissa axis represents color difference signal VC/(VR+VC); the left ordinate axis, luminance signal VR+VC; and the right ordinate axis, reflection density of achromatic color, respectively. Achromatic colors are on the area adjacent to the color difference signal=0.5 and the areas of low luminance signal. These area are expressed by diagonal lines in the figure. Red series colors are on the area whose color difference signal is lower than 0.5. Cyan series colors are on the area whose color difference signal is higher than 0.5. Since the reflection density and luminance signal have the relationship illustrated in the figure, these signals can be easily outputted in any form. The abscissa axis of the example shown in the figure is the color difference signal VC/(VR+VC). However, taking VR/(VR+VC) for the abscissa axis may produce the same results.

Figure 9:
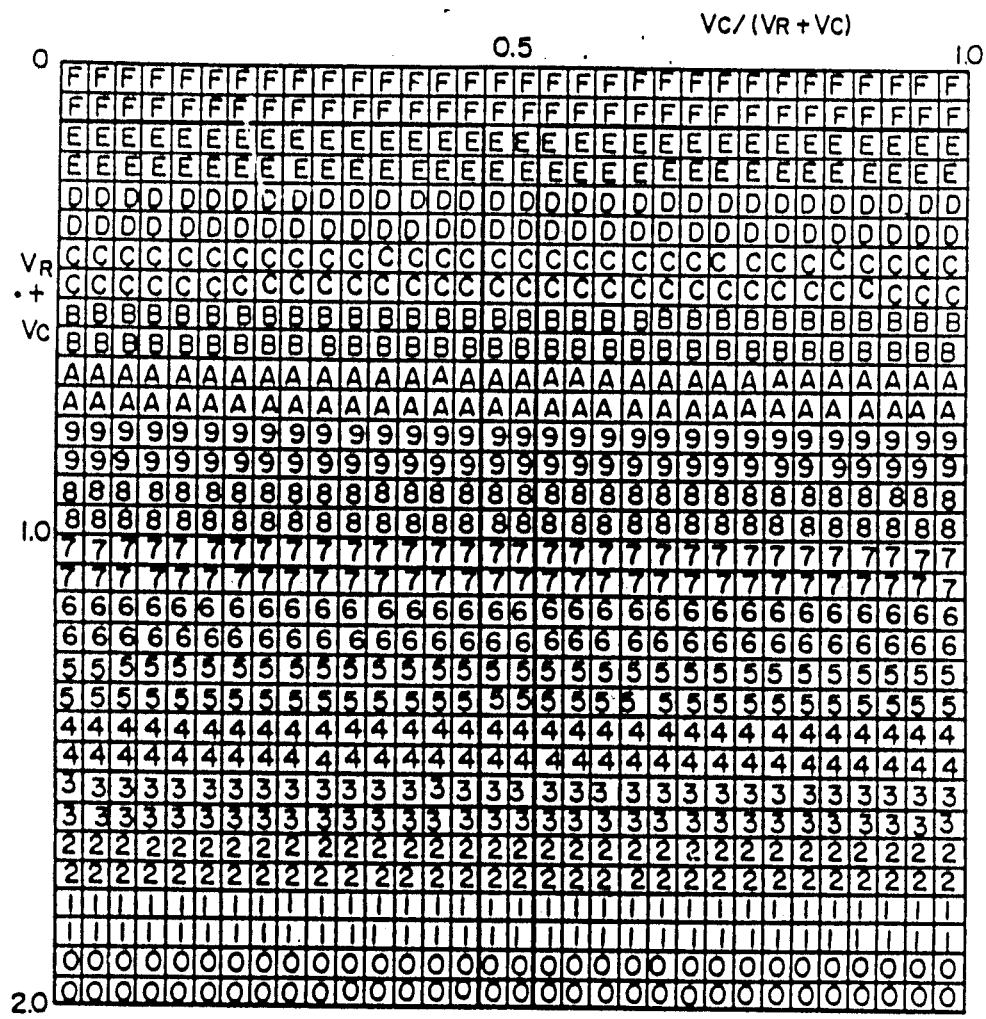
FIG. 9 is a diagram showing one example of detailed arrangement in ROM table corresponding to the color extraction map in FIG. 8-a.

In an actual image processing apparatus, the color extraction map shown in FIG. 8-a is produced and stored within a ROM table. FIG. 9 is one example of a ROM table having a capacity of 32×32 elements. Therefore, the address bit number consists of 5 bit for row address of (VR+VC) and 5 bit for column address of (VC/(VR+VC)). The quantized density corresponding values (pattern) obtained from the reflection density of the document are stored in this ROM table. The coordinate system shown in FIG. 8-a is produced as a form of the ROM table shown in FIG. 9. However, the form is not limited to a ROM table. The means to realize the coordinate system is not restricted to such a memory.

STEP 4

In this step, the apparatus converts image data extracted in step 3 into multiple-coded data based on respective threshold values of each color gamut. The output device reads the density corresponding values stored in the ROM table using address signals, converts the read data into binary-coded data based on each threshold value assigned to color gamuts of red series, cyan series, and achromatic color, and outputs the binary-coded data. The output data, however, are not limited to the binary-coded data, and multiple-coded data may be used.

For instance, when a fixed threshold value is used, cyan series images of a document mainly position within the range having values of C, D, E, F, etc. (hexadecimal) in the ROM table (FIG. 9), because the luminance signal (VR+VC) and reflection density from a document have a clear relationship as described in FIG. 8-a. On the other hand, red series images mainly position within the range having values of 8, 9, A, B, C, D, etc. (FIG. 9). If a fixed threshold value is set to "C" without changing threshold values for each color gamut, blue series images are all outputted as binary-coded "1", and expressed with sufficient density. However, 8, 9, A, and B of red series images are outputted as binary-coded "0", and sufficient density cannot be attained. To eliminate these disadvantages of the fixed threshold value having no flexibility for color components, the threshold values are changed per each color gamut.

For example, to binary-code red series images, a threshold value of "8" is used as the fixed threshold value for red series images in the above described case. By using the threshold value of "8", all red series images of 8 to D are outputted as a binary-code of "1", and expressed with sufficient density.

FIG. 10 is a block diagram showing configuration of one embodiment of the present invention. In this figure, 41 is a first CCD which receives optical information of red series colors; 42, a second CCD which receives optical information of cyan series colors; 51, a first amplifier which amplifies photoelectrical output from the first CCD 41; and 52, a second amplifier which amplifies photoelectrical output from the second CCD 42. The first and second CCDs 41 and 42 compose a photoelectric conversion means 40, and the first and second amplifiers 51 and 52 compose an amplification unit 50. 61 is a first A/D converter which converts the linear output from the first amplifier 51 to digital data; 62 is a second A/D converter which converts the linear output from the second amplifier 52 to digital data. The first and second A/D converters 61 and 62 compose an A/D conversion unit 60. For example, an A/D converter having 6 bit is employed as the A/D converters 61 and 62. 72 is a first memory which stores the luminance signals (VR+VC). 73 is a second memory which stores the color difference signals (VC/(VR+VC)). 81 is a third memory which receives, as address signals, the output from the first and second memories 72 and 73, and outputs the data of chromatic colors (red and cyan). 82 is a fourth memory which receives, as address signals, the output from the first and second memories 72 and 73, and outputs the data of achromatic colors (black, grey, and white). The first and second memories 72 and 73 compose a color extraction information generation means 70. The third and fourth memories 81 and 82 compose a color information storage means 80. The data in the memories 81 and 82 compose the ROM table shown in FIG. 9.

43 is a first buffer which temporarily stores the output from the third memory 81. 44 is a second buffer which temporarily stores the output from the fourth memory 82. 45 is a color select means which receives color select signals of B (black), B (blue), and R (red) which hereafter is called a B.B.R signal. The outputs from this means are applied to the first and second buffer 43 and 44. 346 is a comparison circuit which compares the image data outputted from either of the first buffer 43 or second buffer 44 with a threshold value, and obtains multiple-coded outputs (including binary-coded outputs). 347 is a threshold value circuit which outputs respective threshold value of each color gamut according to the color select signals from the color select means 45. For instance, a digital comparator is employed as the comparison circuit 346, and a ROM in which respective threshold values corresponding to each color gamut are inputted is used as the threshold value circuit. In addition to the output from the color select means 45, density determination signals are also inputted into the threshold value circuit 347. Therefore, the threshold values are changed by the density determination signals in addition to the color select signals. Numerals written in FIG. 10 represent the bit number of the signal lines. Further, the operations of the apparatus configured above are described as follows.

The optical information from a color document is injected into the optical means, and is then separated into red and cyan series as shown in FIG. 7. The separated optical information of red and cyan series colors enters into the CCDs 41 and 42, and is converted to electrical signals. The converted image signals advance to the amplifiers 51 and 52, are amplified linearly to a predetermined level, and then converted to digital data by the following A/D converters 61 and 62. The converted digital data of red and cyan series image data are normalized based on the output value of the reference color (white). That is, assuming the image data of the reference color is "1.0", the image data of red and cyan series are normalized to be VR and VC.

The luminance signals (VR+VC) are stored into the first memory 72, and the color difference signals (VC/(VR+VC)) are stored into the second memory 73. The output signals from the first and second memories 72 and 73 are inputted into the third and fourth memories 81 and 82 as address signals. The density corresponding data stored in the addresses inputted into the third and fourth memories 81 and 82 are outputted and held in the buffers 43 and 44.

On the other hand, the color select means 45 receives B.B.R signals and outputs select signals to either of the first buffer 43 or the second buffer 44. For instance, when the first buffer 43 is selected, density corresponding data of red or cyan are outputted. When the second buffer 44 is selected, density corresponding data of black series (white, grey, and white) are outputted. The outputted density corresponding data enter the comparison circuit 346. Into the threshold value circuit 347 that outputs the threshold values into the comparison circuit 346, color select signals from the color select means 45 and density determination signals are inputted. The threshold value circuit 347 outputs the threshold values corresponding to each color gamut and density value. The comparison circuit 346 converts the density corresponding data to binary-coded or multiple-coded data based on the threshold values that are set per every color gamut and on the density corresponding values. A color document data processed by the above mentioned method can be generated by inputting these binary-coded data into a printer or copying machine. Moreover, there are many recording means to represent the binary-coded data, such as exposure onto an actionolite surface using an optical fiber tube (OFT), liquid crystal display (LCD), laser ink jet, thermal transfer, silver salt, or non-silver salt material, and also by an output onto a CRT. The recording means is not limited to the above described examples. Above described steps are repeated whenever the CCDs 41 and 42 receive new optical information.

The embodiment shown in FIG. 10 employs the separately mounted color extraction information generation means 70 and color information storage means 80. However, these two means may be integrated into one part. When the recording means possesses functions to record images with blue, red, and black, the functions are driven per each color scanning operation during one frame, for example, in the sequence of blue, red, and black; thereby, each color is drawn respectively. That is, the following operations are executed; document scanning as first scanning→density corresponding value output from the ROM table→blue recording→document scanning→density corresponding value output from the ROM table→red recording→document scanning→density corresponding value output from the ROM table→black recording. The output signals from the ROM table to the recording device pass through the gate means (color select means 45, and buffers 43 and 44 shown in FIG. 10) wherein only the output signals assigned in the cyan area are made effective during the blue recording operation.

When the table shown in FIG. 5 is used, the colors of one picture element outputted during three scanning operations are always expressed by red, blue, and black (achromatic color), because VR and VC for one picture element in a color document are one value. On the contrary, to express the picture element by neutral colors, overlapped color gamuts may be required for each VR or VC. That is, it is required to record one picture element with two or more colors. To realize this, the color gamut is set independent to (VR+VC) and (VC/(VR+VC)), and the separate memories are provided, thereby ensuring to express (reproduce) one picture element with purple or brown.

FIGS. 11-a, 11-b and 11-c show examples of the ROM tables according to the present invention, which is an improvement of the color separation map shown in FIG. 9. Each of them has a capacity of 32×32 elements capable of being accessed by 5 bit row address (VR+VC) and 5 bit column address (VC/(VR+VC)). The quantized, 4 bit density corresponding values (density data) obtained from the reflection density of color documents are stored in these ROM tables. The output device reads the density corresponding values using the color select signals, binary-codes the read values using the threshold values assigned to each color gamut, and outputs the binary-coded data. The output signals are not limited to binary-coded data, and may be any multiple-coded data. FIG. 11-a is a ROM table for black color gamut; FIG. 11-b, a ROM table for cyan color gamut; FIG. 11-c, a ROM table for red color gamut.

These constituted ROM tables facilitate multi-color printing by a copying machine.

For instance, the first scanning a document reads the density corresponding values of black from the ROM table shown in FIG. 11-a using B.B.R signals, and permits black toner to adhere to the corresponding positions on the photoconductor drum and transfer them onto a copying paper. Next, the second scanning the same document reads the density corresponding values of cyan from the ROM table shown in FIG. 11-b using B.B.R. signals, and permits blue toner to adhere to the corresponding positions on the photoconductor drum and transfer them onto the same copying paper. Last, third scanning the same document reads the density corresponding values of red from the ROM table shown in FIG. 11-c using B.B.R. signals, and permits red toner to adhere to the corresponding positions on the photoconductor drum and transfer them onto the same copying paper. A multi-color image can be printed by the transfer printing process described above. As clearly described in the figures, the ROM tables for black color gamut (shown in FIG. 11-a), for cyan color gamut (shown in FIG. 11-b), and for red color gamut (shown in FIG. 11-c) have the density corresponding value storage area A, B, C, and D which overlap to the same address area in the other ROM table. Hereinafter, an operation is explained, wherein a purple colored part in a document is read and recorded by an electrophotography method, referring to FIG. 12.

By the first scanning, a certain picture element of a color document, (for example, an element on the 5th row and 20th column of FIG. 11-a, hereinafter referred to as (5, 20)) is addressed, and a density corresponding value of zero is outputted from the black memory 83. Therefore, black toner does not adhere to the copying paper, even after the exposure process based on the binary-coded data, black toner development, and transfer printing processes. By the second scanning, the (5, 20) element of FIG. 11-c is again addressed, and a density corresponding value of 7 is outputted from the red memory 81. Red toner adheres to the copying paper by the binary-coding, exposure based on the binary-coded data, red toner development, and transfer printing processes. By the third scanning, the (5, 20) element of FIG. 11-b is further addressed, and a density corresponding value of D is outputted from the cyan memory 82. Blue toner adheres to the portion in the copying paper where red toner adhered by the same steps of the processes, thereby a purple image is reproduced. That is, the specific density corresponding values are stored within the above described area A, B, C and D. Reading a density corresponding value in the A area of FIG. 11-b and a density corresponding value in the corresponding area of FIG. 11-c using the same address can make a purple image (red+blue). With the same series of processing and concept, reading a density corresponding value in the C area of FIG. 11-a and a density corresponding value in the corresponding area of FIG. 11-c using the same address can make a brown image (red+black). Other neutral colors (pure color mixture) can be made by preparing the ROM tables in order that the tables have areas whose density data overlap each other. For instance, by using pure colors of yellow and red instead of red and blue, an orange image can be reproduced by the same way as described above.

Figure 12:
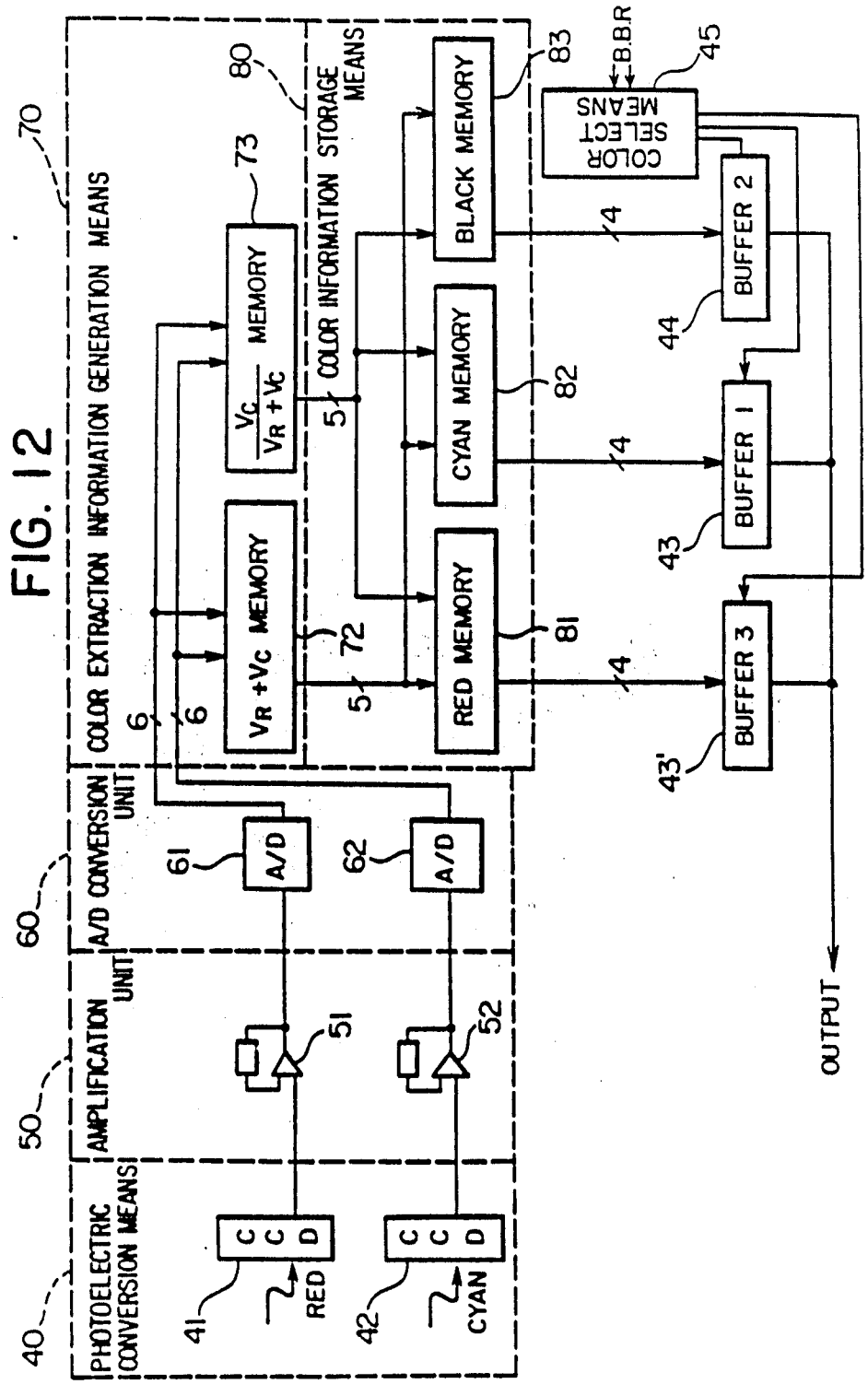
FIG. 12 is a structural block diagram showing one embodiment of the apparatus using the ROM table shown in FIGS. 11-a to 11-c.

FIG. 12 shows an embodiment to express neutral colors described above. Comparing to the embodiment shown in FIG. 10, the color information storage means is configured so that it is separated into each color.

In this figure, 81 is a third memory which receives, as addresses, the output from the first and second memories 72 and 73, and outputs density corresponding values of red series colors; 82, a fourth memory which receives, as addresses, the output from the first and second memories 72 and 73, and outputs density corresponding values of cyan series colors; 83, a fifth memory which receives, as addresses, the output from the first and second memories 72 and 73, and outputs density corresponding values of achromatic colors (black, grey, and white). The first and second memories 72 and 73 compose the color extraction information generation means 70. The third to fifth memories 81 to 83 compose a density information storage means 80.

Thus, an apparatus according to the present invention comprises separated density information storage means per each color gamut. The ROM tables shown in FIGS. 11-a, 11-b and 11-c are generated and stored in the memories 81 to 83, which receive, as addresses, the output data from the first and second memories 72 and 73, and output, as the image data, the density corresponding values stored in the addressed area.

43' is a third buffer which temporarily stores the output from the third memory 81; 43, a first buffer which temporarily stores the output from the fourth memory 82; 44, a second buffer which temporarily stores the output from the fifth memory 83; 45, is a color select means which receives B.B.R signals, and the output from this means is applied to the first to third buffers 43 to 44. The output from either of the first to third buffers 43 to 44 is the output of the apparatus shown in FIG. 12.

According to this embodiment, the apparatus may comprise an optical means which obtains optical signals of at least two kinds of colors having a different wavelength from a color document; a photoelectric conversion means which converts the optical signals from the optical means into electrical signals; a color extraction information generation means which arithmetically processes the electrical signals of images outputted from the photoelectrical conversion means, and generates color extraction information based on the operated results; and a density information storage means wherein a plurality of density data storage area that receive, as an address, the output from the color extraction information generation means are equipped separately per each color gamut.

Figure 13:
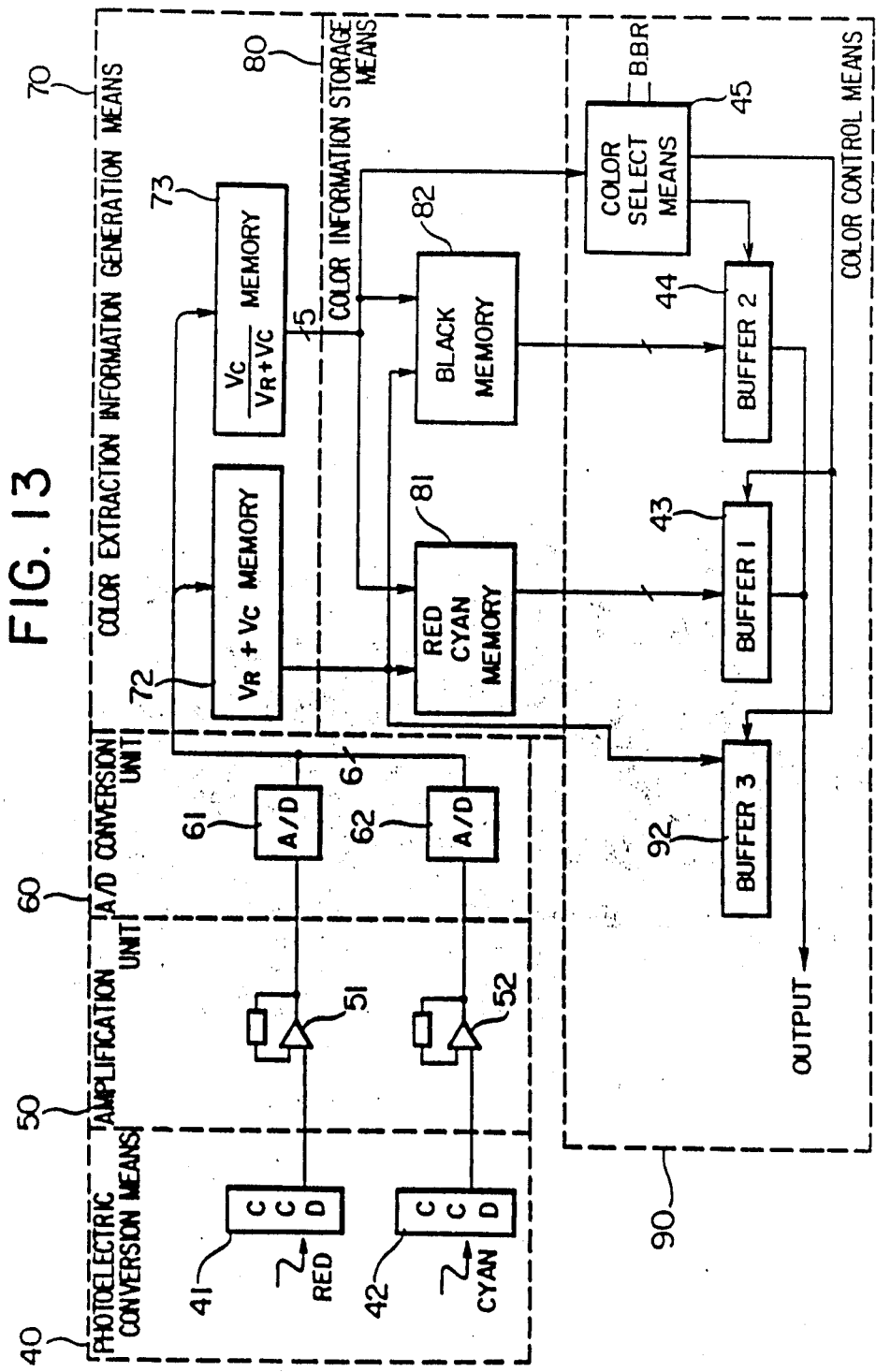
FIG. 13 is a structural block diagram showing one embodiment of the apparatus comprising a means for directly outputting an extracted color data.

Furthermore, in the apparatus shown in FIG. 10, the color information storage means may be divided into the parts for chromatic and achromatic colors, the outputs from each part may be taken out separately or at the same time depending on the situation, and the information from the color extraction information generation means may be taken out directly as the image data for multiple-coding only during the all black mode as a preferred example of a monochrome mode. That is, the color extraction information generation means, color information storage means, and color control means shown in FIG. 13 are configured as follows:

72 is a first buffer memory which stores the luminance signal data (VR+VC) of the 5 bits from the right in the 6 bit data; 73, a second buffer memory which stores the color difference data (VC/(VR+VC)); 81, a third memory (red/cyan memory) which receives, as addresses, the output from the first and second memories 72 and 73, and outputs the density corresponding values (density data) of the chromatic colors (red and cyan); 82, a fourth memory (black memory) which receives, as addresses, the output from the first and second memories 72 and 73, and outputs the density corresponding values (density data) of the achromatic colors (black, grey, and white). The first and second memories 72 and 73 compose the color extraction information generation means 70. The third and fourth memories 81 and 82 compose the color information storage means 80.

43 is a first buffer which temporarily stores the output from the third memory 81; 44, a second buffer which temporarily stores the output from the fourth memory 82; 92, a third buffer which directly receives the output from the first memory 72 and temporarily stores the output; 45, a color select means which receives the B.B.R signals and the output from the second memory 73, and the output from this circuit is applied to the first through third buffers 43, 44, and 92. The output from either of the first through third buffers 43, 44, and 92 based on the B.B.R signals is the output of the apparatus shown in FIG. 13. The first through third buffers 43, 44, and 92, and the color select means 45 compose a color control means 90 which controls the output from the color information storage means 80. In the monochromatic mode, i.e. all black mode (this mode records both red and blue images on the color document with black color), the color select means 45 drives the third buffer 92 to output the luminance signal data (VR+VC) directly, in this embodiment. The embodiment shown in FIG. 13 comprises; an optical means which obtains at least two kinds of optical information from a color document; a photoelectrical conversion means which converts optical information from the optical means to electrical signals; a color information means which arithmetically processes the electrical signals from the photoelectrical conversion means, and outputs color extraction information and color information data; and a color control means which controls the output from the color information means. This embodiment is characterized in that the output from the color information means is compared with a threshold value, and is directly multiple-coded in a monochromatic mode. In the all-black mode, the luminance signal (VR+VC) is multiple-coded, not the data stored in the memories 81 and 82. Therefore, the image processing is possible using threshold values equivalent to those of a conventional monochromatic digital copying machine, thereby facilitating easy setting of threshold values. Moreover, logical add operations of black data, blue data and red data are not required, thus ensuring simple circuit configuration.

Figure 14:
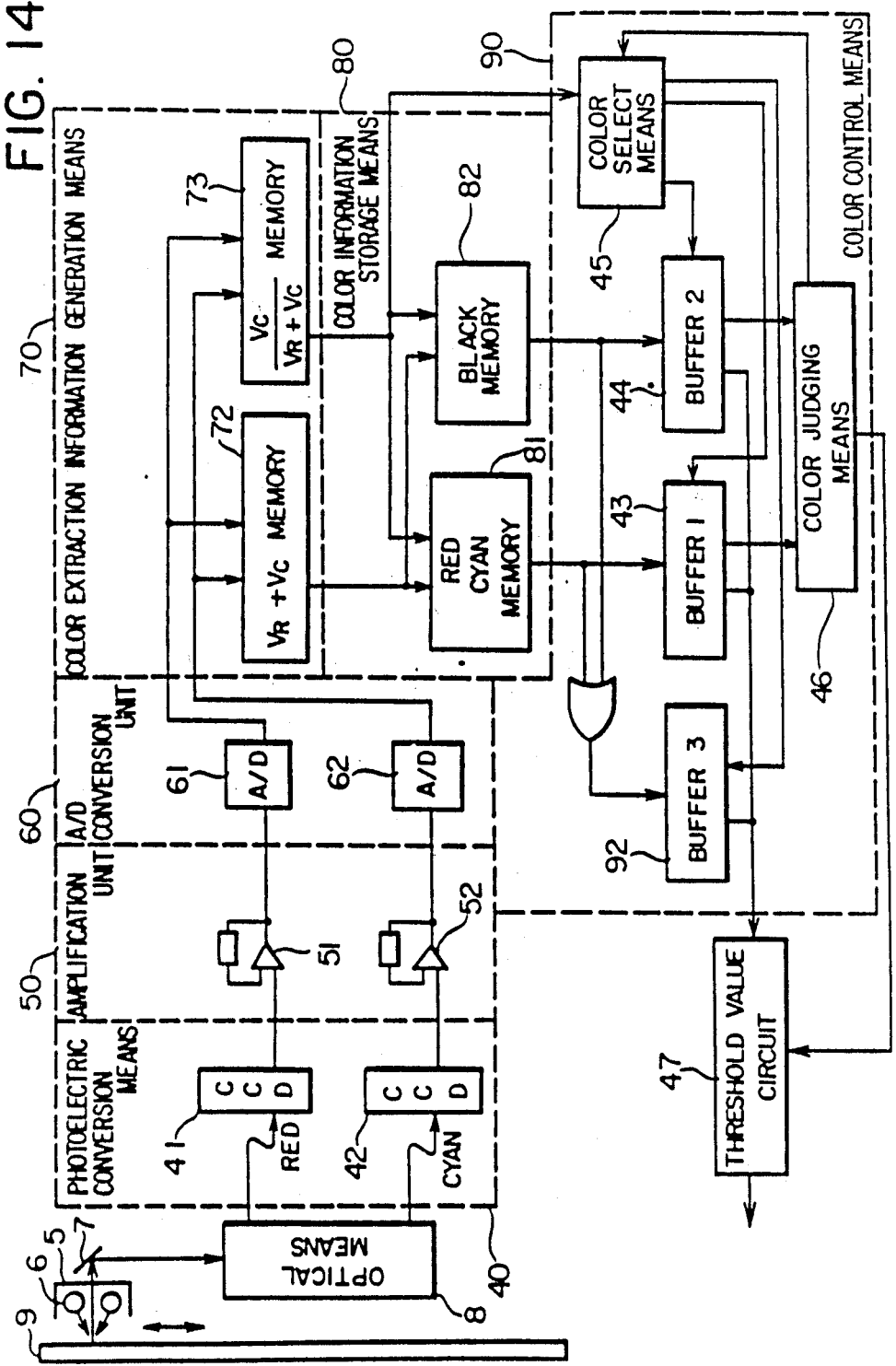
FIG. 14 is a structural block diagram showing one embodiment of the apparatus comprising a control means.

Next, a color image processing apparatus that is one embodiment of step 4 described in the flowchart of FIG. 5 is explained referring to FIG. 14, wherein density histograms per each color are obtained by a preliminary scanning; and the number of scanning and threshold values for multiple-coding are decided based on the density histograms; thus ensuring a high speed image formation with a relatively simple configuration.

In FIG. 14, the parts identical to those shown in FIG. 10 are designated by the same numbers. 9 is a color document; 5, a read unit which mainly comprises a light source 6; 7, a mirror which introduces an image to an optical means 8. The read unit 5 and the mirror 7 scan the color document in the arrow directions, so called slit-scanning, and introduce the image to a first and a second CCD's 41 and 42. 51 is a first amplifier which amplifies the photoelectrically converted output from the first CCD 41; 52, a second amplifier which amplifies the photoelectrically converted output from the second CCD 42; The first and second CCD's 41 and 42 compose a photoelectric conversion means 40, and the first and second amplifiers 51 and 52 compose an amplification unit 50. 61 is a first A/D converter which converts the output from the first amplifier 51 into digital data; 62, a second A/D converter which converts the output from the second amplifier 52 into digital data; The first and second A/D converters compose an A/D conversion unit 60. For the A/D converters 61 and 62, a 6-bit converter is employed as a preferred example.

72 is a first memory which stores the luminance data (VR+VC); 73, a second memory which stores the color difference signal data (VC/(VR+VC)); 81, a third memory which receives, as addresses, the output from the first and second memories 72 and 73, and outputs the data of chromatic colors (red and cyan); 82, a fourth memory which receives, as addresses, the output from the first and second memories 72 and 73, and outputs the data of achromatic colors (black, grey, and white). The first and second memories 72 and 73 compose a color extraction information generation means 70, and the third and fourth memories 81 and 82 compose a color information storage means 80.

43 is a first buffer which temporarily stores the output from the third memory 81; 44, a second buffer which temporarily stores the output from the fourth memory 82; 45, a color select means which receives the B.B.R signals and the output from the second memory 73, and the output from this circuit is applied to the first and second buffers 43 and 44;

46, a color judging unit which receives the output from the first and second buffers 43 and 44, counts the data of each color, obtains the density information of each color, and determines the number of scanning operations of the document and threshold value information for multiple-coding operation. (This unit is described in detail later.) 47 is a threshold circuit which receives the output from the color judging unit as threshold information, and multiple-codes the output (density data) from the buffers 43 and 44 (including binary-coding). The first and second buffers 43 and 44, color select means 45, and color judging unit 46 compose a color control means 90 which controls the output from the color information storage means 80. The output from the threshold circuit 47 is the output from the apparatus shown in FIG. 14. The operations in the apparatus configurated above are explained as follows:

When a color document is scanned, the optical information advances to the optical means shown in FIG. 7, and is separated into some information according to the wavelength, for instance, into red series and cyan series colors. The separated optical information of red and cyan series colors enters into the CCDs 41 and 42, and is converted into electrical signals. The converted image signals advance to the amplifiers 51 and 52, and are amplified linearly to a predetermined level, then converted to digital data by the A/D converters 61 and 62. At this time, the red and cyan image data converted to digital data are normalized with the output value of the reference color (white) in a circuit that is not illustrated in the figure. That is, assuming the image data of the reference color as "1.0", the circuit normalizes the image data of red and cyan series to let the normalized data be VR and VC. Using the digital data, VR and VC, a coordinate system is created by the method described in step 3, and colors are extracted based on the color extraction map shown in FIG. 8-a. First, the color document is scanned by a slit exposure optical means that is employed in a usual copying machine, the obtained image passes through the color separation means shown in FIG. 7, and is separated into red and cyan series colors. The photoelectric conversion means like CCD receives the separated color signals, converts to the image signals VR and VC, then (VR+VC) and (VC/(VR+VC)). The density corresponding values are outputted using these data as addresses according to the color extraction map (table).

On the other hand, if the recording means, which records the image onto recording media, employs a recording part which prints with black, blue, and red, the part is driven per every frame, for example in this order; black, blue, and red, corresponding to each of the scanning operation described above. Thereby each color is printed onto the same medium and overlapped.

Figure 2:
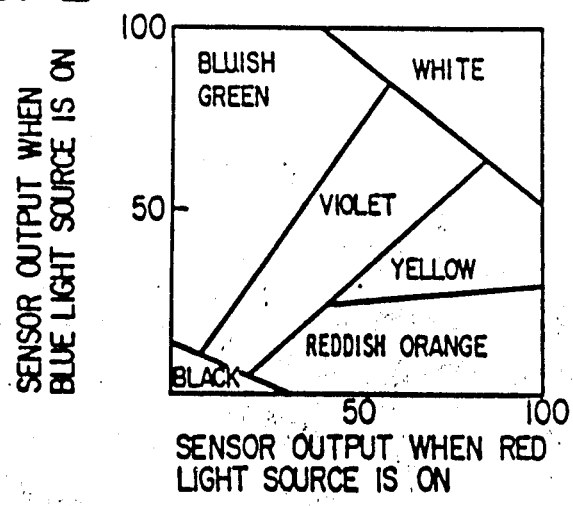
FIGS. 2 and 3 are diagrams showing examples of conventional color extraction maps.

That is, the following steps are executed sequentially; scanning the color document→density corresponding value output from the color extraction table→black recording→scanning the color document→density corresponding value output from the color extraction table→blue recording→scanning a color document→density corresponding value output from the color extraction table→red recording. A means, which makes only the output assigned in the cyan area to be effective during blue-recording operation, that is, possesses a substantially gate function (color select means 45, buffers 43 and 44 shown in FIG. 2), is equipped in the recording means, thereby a color corresponding to the color gamut in the image processing unit is printed correctly.

In an actual image processing apparatus, the color extraction map is created and stored in the ROM table; more concretely, in the third and fourth memories 81 and 82.

As described above, red and blue colors can be determined by judging whether or not the color difference signal (VC/(VR+VC)) is larger than 0.5. Therefore, the chromatic color data may be stored in the memory 81 in the group, because the leftmost bit of the color difference signal (VC/(VR+VC)) can determine whether the color is red or blue. To determine whether the color is red or blue series, the color difference signal (VC/(VR+VC)) is introduced into the color select means 45.

The luminance signal (VR+VC) and the color difference signal (VC/(VR+VC)) are stored in the first and second memories 72 and 73, respectively. The output from the first and second memories 72 and 73 is given, as address signals, to the third and fourth memories 81 and 82. The density data stored in the inputted addresses of the third and fourth memories 81 and 82 are outputted and held in the buffers 43 and 44, respectively wherein the density data is the density corresponding data aforementioned. The logical add of the output from the memories 81 and 82 is held in the buffer 92 in this embodiment. (The details are described below.)

On the other hand, the color judging unit 46 counts the density data of each color from the first and second buffers 43 and 44 during a preliminary scanning operation, obtains density histograms, decides the number of scanning operations based on the density histograms, and sets the threshold values. Moreover, the color judging unit 46 transfers the B.B.R signals to the color select means 45 during the scanning operations, and gives the threshold value data for the multiple-coding (including binary-coding) operation to the threshold value circle 47.

Figures 15, 17, 18:
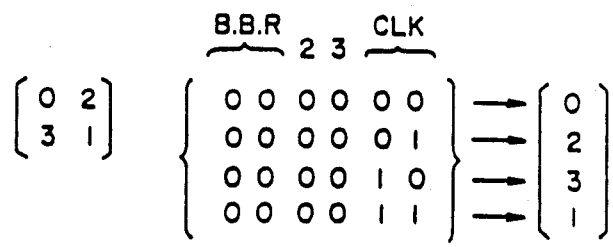
FIG. 15 is a table showing the relationship between the B.B.R signals and the designation color.
FIG. 17 is a table showing the relationship between the B.B.R signals, gate signals and the designation color.
FIG. 18 is a table showing the relationship between the B.B.R signals, input terminal of threshold value ROM and the designation color.

FIG. 15 is a table showing the relationship between the B.B.R signals and the designation color. The B.B.R signals are inputted with 2-bit signals. The color select means 45 controls the first and second buffers 43 and 44 using the B.B.R signals and the leftmost bit of the color difference signals (VC/(VR+VC)). For instance, when a B.B.R signal of (1 0) shown in FIG. 15 is inputted, the first buffer 43 is made to be effective, and at the same time, an operation is executed using (VC/(VR+VC)) to prevent red and blue confusion, then the buffer 43 outputs red data. This explains a red signal selection operation. However, the same steps are executed during the blue signal selection operation, except a B.B.R signal of (0 1) is inputted.

When a B.B.R signal of (0 0) is inputted, the second buffer 44 is made to be effective, and only the data in the black memory is outputted. When a signal of (1 1) is inputted, the current mode turns to monochrome mode (red and blue series colors in the document are reproduced as black color), both first and second buffers 43 and 44 are made to be effective.

Thus, the density data of each color are outputted from the apparatus illustrated in the figure. These density data are converted into multiple-coded data (including binary-coded data) using the threshold value that are set per each color gamut by the threshold value circuit 47. The color document is reproduced by inputting the multiple-coded data into a printer, copying machine, etc. More concretely, combining the B.B.R signals and designation colors in a developing unit of an output apparatus enables color conversions. When a thermal transfer printing apparatus is employed, color ribbons or color heads are required to be assigned to the B.B.R signals. The above described steps are repeated whenever the CCDs 41 and 42 receive a new optical information.

Figure 16:
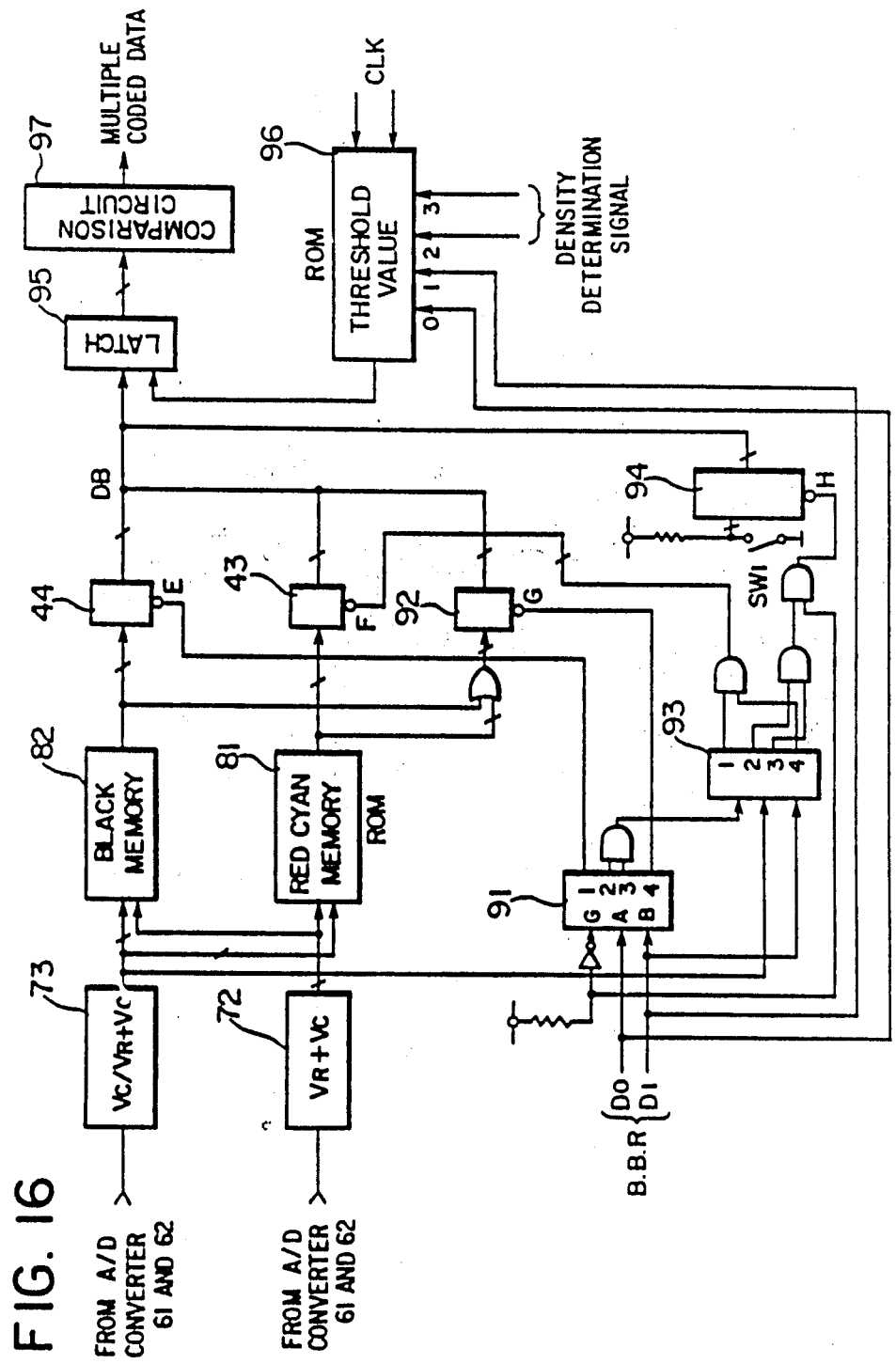
FIG. 16 is a block diagram showing an embodiment of the color control means.

FIG. 16 is a block diagram showing an embodiment of the color control means 90. The parts identical to those shown in FIG. 14 are designated by the same numbers. In FIG. 14, 91 is a first decoder which receives the B.B.R signals for designating color. 92, a third buffer (tristate buffer) which receives the logical OR signals of the output from the memories 81 and 82. The first and second buffers 43 and 44 are tristate buffers. The first output from the decoder 91 enters, as a gate signal E, into the second buffer 44, the logical product of the second and third outputs from the decoder 91 enters into the second decoder 93, and the fourth output enters, as a gate signal G, into the third buffer 92.

In addition to the logical product signal, the color difference signal output from the memory 73 and the bit signal (D1) of the B.B.R signals enter into the second decoder 93. The logical product signal of the first and fourth outputs from the decoder 93 enters into the first buffer 43 as a gate signal F. The logical product signal of the second and third outputs from the decoder 93 enters into the fourth buffer 94 as a gate signal H. The fourth buffer 94 is constituted so that signal 0/1 is inputted by the ON/OFF switching of a switch SW1. The output lines from the first to fourth buffers 43, 44, 92, and 94 are commonly connected into a latch means 95.

96 is a threshold value ROM in which various threshold data are stored, and the B.B.R signals, density determination signals, and clock CLK are inputted. The threshold value ROM 96 is constituted so that optimum threshold data are outputted from this ROM according to the color designation and density data. The output from the threshold value ROM 96 is transferred into the latch means 95. 97 is a comparison circuit which receives the density data and threshold data per each color, and executes the binary- or multiple-coding process of the image signals. For instance, a digital comparator is employed as the comparison circuit 97.

The operation of a thus constituted circuit is explained as follows:

When a B.B.R signal is (0 0), only the gate signal E is equal to "0" by the first and second decoders 91 and 93 activating the second buffer 44. As a result, only the output from the black memory 82 is effective, the content in the black memory is outputted, and latched in the latch means 95.

When a B.B.R signal is (1 0), the operation varies as shown in FIG. 17 according to whether the leftmost bit of the color difference data (VC/(VR+VC)) is "0" or "1". If the leftmost bit is "0", the decoder 93 makes only the gate signal F to be "0". As a result, only the first buffer 43 is effective. Activating the buffer 43 outputs only the red data in the memory 81, and the data is latched in the latch means 95. When the leftmost bit is "1", the gate signal F also turns to "1" and all outputs from the buffers 43, 44, and 92 turns to high-impedance, causing no density data to be outputted. In an actual apparatus, a datum is outputted from the fourth buffer 94 so that no black or white is printed. When a B.B.R signal is (0 1), the operation varies according to whether the leftmost bit of the color difference date (VC/(VR+VC)) is "0" or "1". When the leftmost bit is "0", all of the gate signals E, F, and G from the buffers 43, 44, and 92 turn to "1", causing no density data to be outputted as the same described above. When the bit is "1", the second decoder 93 turns only the gate signal F to "0".

As a result, only the cyan (blue) data from the memory 81 is outputted, and latched in the latch means 95.

Finally, the B.B.R signal is (1 1), the first decoder 91 turns only the gate signal G to "0". As a result, only the third buffer 92 is activated and outputs logical add data (all black, all red, all blue) of all color data (black data, red data, and blue data), and the outputted data is latched in the latch means 95.

In FIG. 14, an embodiment of monochrome mode is aforementioned wherein both first and second buffers 43 and 44 are made to be effective. In addition to this embodiment, monochrome mode is also attained by utilizing the third buffer 92 in the above manner.

Where considering the B.B.R signal is (1 0) or (0 1): If the signal is (1 0), the leftmost bit of the color difference signal (VC/(VR+VC)) becomes "0" (red). Then, the gate signal F turns to "0" and red data are outputted. On the other hand, when the leftmost bit of the color difference signal (VC/(VR+VC)) is "1", all the gate signals E, F, and G turn to "1". Only the gate signal H of the fourth buffer 94, however, turns to "0", activating only the fourth buffer 94. In this case, if the switch SW1 is off, the inputted data to the buffer 94 turns "1", and white data are outputted; when the switch SW1 is on, the inputted data to the buffer 94 turns "0", black data are outputted. Thus, the circuit functions so that only designated colors are outputted by outputting white data when a signal of color other than designated is inputted in a usual mode. All black (all red, all blue) signal is outputted when a signal of color other than designated is inputted in a reverse mode. Further, the binary-coding operation using B.B.R is described below.

As described above, the B.B.R signals are given to the threshold value ROM 96 as addresses. Assuming the threshold value data is constituted by the 2×2 matrix, the addresses of the threshold value ROM 96 are decided as given in FIG. 18. Predetermined optimum threshold values may be stored in the corresponding addresses. The B.B.R, 2, 3, and CLK in the uppermost line of the table shown in FIG. 18 designate the input terminals of the threshold value ROM 96 in FIG. 16. The degree of each color density (low, regular or intermediate, and high) is changed over according to instructions inputted from another unit, for example a control unit (not illustrated in the figure).

The storing method of the threshold value data into the threshold value ROM 96 is as given in FIG. 19-a, 19-b and 19-c. For instance, the threshold value data of 2×2 matrix shown in FIG. 19-a are stored by each numerical datum shown in FIG. 19-c entered into the addresses corresponding to the data shown in FIG. 19-b. When reading out the stored threshold value data, the threshold values of 0→2→3→1 are read in this order. This step is effective during the multiple-coding (more than three-code) process as well as during the binary-coding process. Changing the relationship between the color designation signal and color producing means enables the color conversion. For example, the blue part in the figure can be replaced with red. In FIG. 19-a, the threshold values (0, 2, 3, 1) are stored in the matrix as one preferred example, the fixed threshold values, such as (2, 2, 2, 2), can be also applicable as aforementioned.

Figure 20:
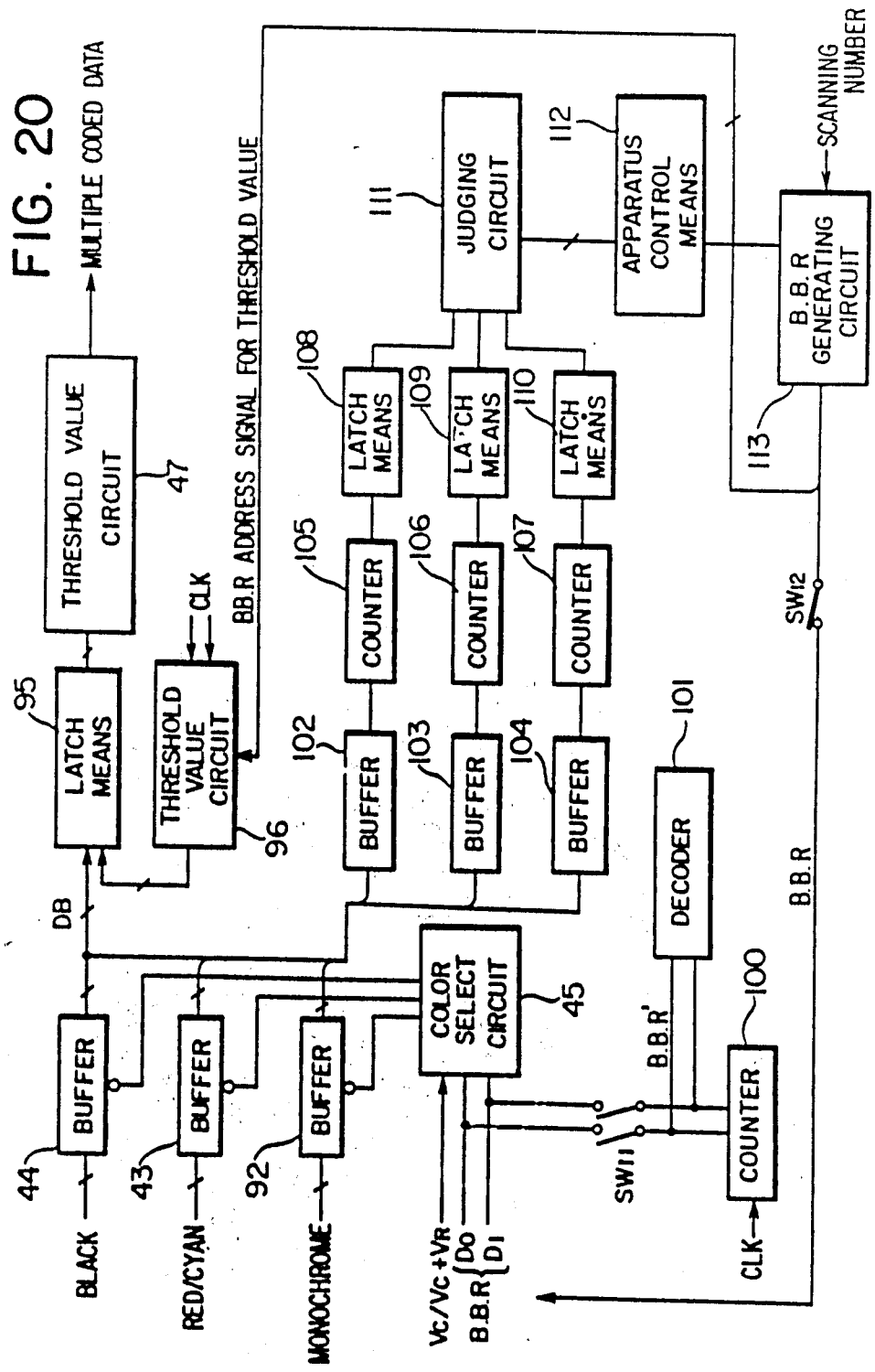
FIG. 20 is a block diagram showing an embodiment of color judging circuit.

FIG. 20 is a block diagram showing an embodiment of the color judging means 46 in FIG. 14. The parts same to those in FIG. 14 and 16 are designated the same numbers. The density data held in the first through third buffers 43, 44, and 92 are outputted sequentially onto a data bus DB by the select signals from the color select means 45, and enter into the latch means 95. Into the other input terminal of the latch means 95, an optimum threshold value is inputted from the threshold value circuit 96 according to a color, and the data are converted into multiple-coded (including binary-coded) data in the following threshold value circuit 47 as previously mentioned concerning to the circuit shown in FIG. 16.

100 is a counter which receives a dot clock (clock outputted per each picture element), generates 2-bit, pseudo-color designation signals of B.B.R', and gives the signals to the color select means 45 through a switch SW11 which is on only during the preliminary scanning operations. At the same time, the B.B.R' signals are always applied into a decoder 101. In this case, the monochrome mode is not considered, and the counter 100 is constituted so that the counter does not generate the signal of (1 1) which selects the monochrome data.

During the preliminary scanning operations, color select signals are sequentially outputted from the color select means 45, and the red-, blue- (cyan), and black-data are taken out, and outputted onto the data bus DB. The outputted data of each color are applied to counter 105 through 107 via buffers 102 through 104. The decoder 101 sequentially gives a color select signal to the buffers 102 through 104 according to the input signals of (00→01→10). The counters 105 through 107 count each input data per each color and create histograms. The count values in the counters 105 through 107 are given to the latches 108 through 110 after the preliminary scanning operations. The output of the latches 108 through 110 are given to a following judging circuit 111.

The judging circuit 111 receives the output from the counters 105 through 107 of each color, and decides the scanning number and threshold values for the multiple-coding operations according to each color information and density histograms. The number of scanning operations is decided based on the number of colors. For instance, when the number of colors is three of red, blue, and black, the number of scanning operations is three. The threshold values for multiple-coding operations are decided as follows: The output (density histogram) from each counter has the characteristics shown in FIG. 21-a for a usual color document which comprises a main image and background picture. A density point K1 on the concave curve shown in FIG. 21-a is adopted as a threshold value for this kind of characteristics. When the difference between the main image and background is not clear, there is no concave part as shown in FIG. 21-b. In this case, the integrated value from the maximum density point Kmax to 0.9 Max (shown by diagonal lines in FIG. 21-b) is adopted as the threshold value, and the codes 2 and 3 shown in FIG. 18 are selected by this threshold value.

Scanning number and threshold values as determined above are given to an apparatus control means 112 from the judging circuit 111. When receiving the information, the apparatus control means 112 gives, to the threshold value ROM 96, the addresses to output the optimum threshold value data, and gives, to a B.B.R signal generating circuit 113, the scanning number information. The B.B.R signal generating circuit 113 is equipped with the other means so that the scanning number is also set from the outside. The B.B.R signal generating circuit 113 gives B.B.R signals to the threshold value ROM 96 and to the color select means 45 through a switch SW12, as well. During the preliminary scanning operations, the switch SW12 is open. Therefore, B.B.R pseudo-color select signals are given to the color select means 45.

If it is assumed that only black and red are detected by the circuit shown in this FIG. 20, and each threshold value for the colors is decided as TB and TR, the B.B.R signal that designates red is assigned as (1 0), and the threshold value of TR is decided during the scanning operation for multiple-coding operation. At this time, the switch SW11 is off, and the switch SW12 is on. When one scanning operation is completed in this condition, the B.B.R signal is assigned as (0 0) that represents black, and the threshold value of TB is decided. The scanning operation is completed by two scannings in this case.

After the color select signals and threshold values are determined as described above, the image data read from the color document are multiple-coded and outputted. The methods of deciding the threshold values are not restricted to the above described one, and other methods may be applied. The multiple-coded data outputted from the threshold value circuit 47 are reproduced by means of output apparatus like a printer.

As described above, this embodiment is characterized in that colors on a color document and density information of each color are obtained by preliminarily scanning the color document so that the number of scanning operations and threshold value information for multiple-coding are decided, in a color image processing apparatus which separates colors on the color document, processes and forms color images. Incidentally, in a color image processing apparatus, which is configured so that an optical means scans a color document and separates the document to a plurality of images, each of which has a specific spectrum characteristics; the separated optical image signals are arithmetically processed to obtain the color extraction information; and the density data per each color that are stored in each information storage means are selected by the color extraction information. In another embodiment of step 4 in the flow chart shown in FIG. 5, a means may be configured so that color information is obtained during a first document scanning operation, and a following scanning operation is controlled based on the color information (including a control to stop the next scanning). In a color control means illustrated in FIG. 22, which is one embodiment of the above described means the parts identical to those shown in FIG. 14 are designated by the same numbers. 46' is a color discrimination circuit which receives (VR+VC) signals from the first memory 72, and (VC/(VR+VC)) signals from the second memory 73, and judges the current color. 47' is a B.B.R generating circuit which receives the output from the color discrimination circuit 46' and generates the B.B.R signals. The first and second buffers 43 and 44, color select means 45, color discrimination circuit 46', and B.B.R generating circuit 47' compose the color control means 90 which controls the output from the color information storage means 80. The output from either of the first or second buffer 43 or 44 is the output of the apparatus shown in the figure.

The color discrimination circuit 46' receives (VR+VC) signals from the first memory 72 and (VC/(VR+VC)) signals from the second memory 73, automatically judges a color contained in a color document (the details are described below), and transfers control signals based on the judging results to the B.B.R generating circuit 47'. The B.B.R generating circuit 47' receives the control signals from the color discrimination circuit 46', generates B.B.R signals, and transfers them to the color select means 45. The color select means 45 receives the B.B.R signals and gives select signals to either of the first or second buffer 43 or 44. The relationship between the B.B.R signal and color designation is as given in FIG. 15. That is, the B.B.R signal is inputted with 2-bit. The color select means 45 controls the first and second buffers 43 and 44 using the B.B.R signals and the leftmost bit of the (VC/(VR+VC)) signal. For instance, as given in FIG. 15, inputting a (1 0) makes the first buffer 43 to be effective, and red data is outputted from the buffer 43. At the same time, an operation is executed using the (VC/(VR+VC)) signal to prevent red and blue confusion. The above example explains the red signal selection. The blue signal selection is the same operation as the above except that a (0 1) signal is inputted.

When a (0 0) is inputted, the second buffer 44 is activated and outputs only the contents in the black memory. Inputting a (1 1) turns the current mode to the monochromatic mode, and both first and second buffers 43 and 44 are activated in this mode (both red and blue colors on the color document are made to black). Thus, density data per each color may be outputted from the apparatus shown in the figure. These density data are converted into binary-coded date (some cases to multiple-coded data) in a binary-coding circuit (that is not shown in the figure) using threshold values set per each color gamut. The original image data are outputted and reproduced by inputting the binary-coded data into a printer or copying machine.

Incidentally, concerning the monochromatic mode for the case of full color mode by yellow, magenta and cyan colors, if taking FIG. 45 as an example of each output levels of yellow, magenta and cyan colors, it can be considered to express by black color for the lower part marked by oblique lines. But, this method cannot treat an original document having a cyan monochrome image.

In this case, it is required to express the output of cyan by black color.

For this reason, in the monochromatic mode for the case of the full color mode, it may be better to express each output of yellow, magenta and cyan color data by black color.

Figure 23:
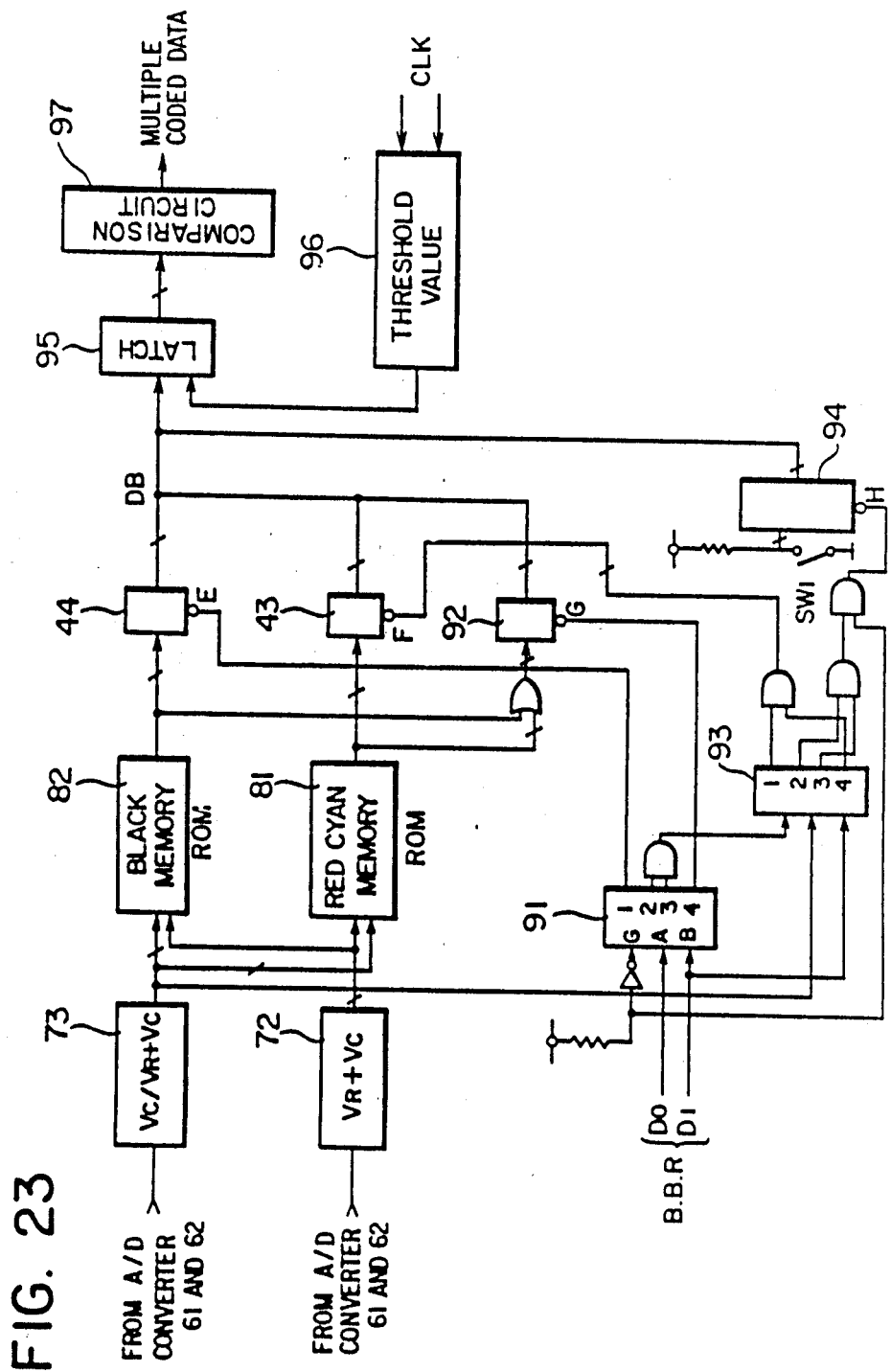
FIG. 23 is a block diagram showing an embodiment of color control means.

FIG. 23 is a block diagram showing a concrete configuration of the color control means 90 in this embodiment. The configuration is similar to that shown in FIG. 16. However, the CLK signals are inputted, and no B.B.R signal is inputted into the threshold value ROM 96, in which various threshold value data are stored. The threshold value ROM 96 is configured so that it outputs optimum threshold values to the latch 95. The configuration and function of the other parts are the same to those shown in FIG. 16. That is, 91 is the first decoder which receives B.B.R signals; 92, the third buffer (tristate buffer) which receives the logical add signal of the outputs from the memories 81 and 82. The first and second buffers 43 and 44 are also tristate buffers. The first output from the decoder 91 enters, as a gate signal E, to the second buffer 44. A logical product signal of the second and third outputs enters into the second decoder 93, the fourth output enters, as a gate signal G, into the third buffer 92.

In addition to the above signal, the color difference signal, the leftmost bit (D1) of the B.B.R signal, enter into the second decoder 93. A logical product signal of the first and fourth outputs from the decoder 93 enters, as a gate signal F, into the first buffer 43. A logical product signal of the second and third outputs enters, as a gate signal H, into the fourth buffer 94. Into the data input terminal of the fourth buffer 94, signals 0/1 are inputted by the on/off operation of a switch SW1. The output lines from the first through fourth buffers 43, 44, 92, and 94 are connected in common to the latch 95.

Hereinafter, concrete configuration of the color discrimination circuit 46' is explained.

Figure 24:
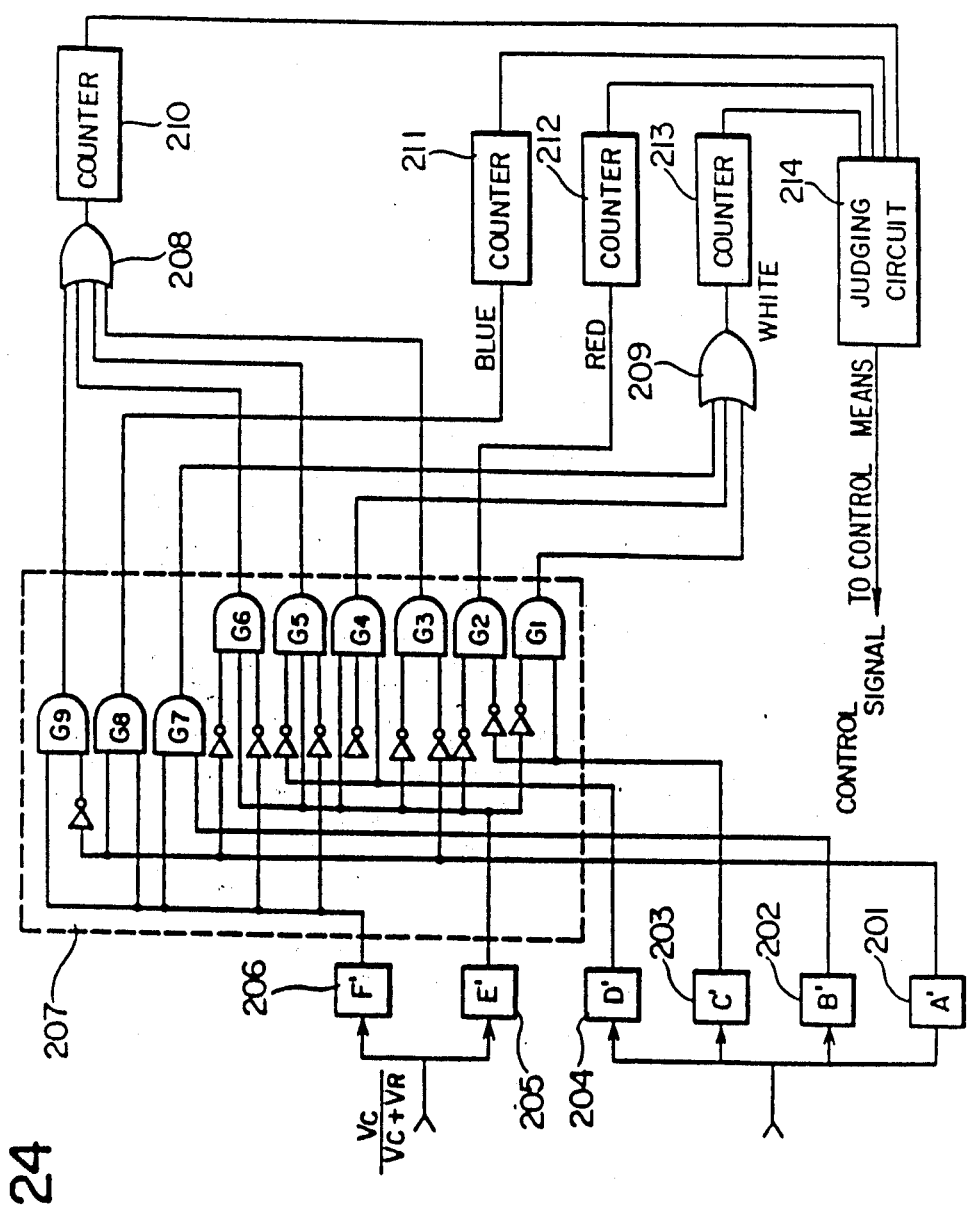
FIG. 24 is a block diagram showing concrete configuration of a color discriminating circuit.

FIG. 24 is a block diagram showing concrete configuration of the color discrimination circuit 46'. In this figure, 201 through 204 are comparators which receive the (VR+VC) signal in common. 205 and 206 are comparators which receive the (VC/(VR VC)) signal in common. These comparators 201 through 206 have each reference datum of A' to F' inputted in advance as given in the figure, and compare input data and the reference datum. These reference data A' to F' correspond to the coordinate values shown in the color extraction map of FIG. 25, wherein the values are set on the color boundary line. The color extraction map shown in FIG. 25 corresponds to that in FIG. 8. 207 is a gate circuit which receives the outputs from the comparators 201 through 206, and generates various gate signals:

The gate circuit 207 comprises a plurality of gate combinations, and outputs 9 kinds of gate signals. Each final step gate is G1 through G9 as shown in FIG. 24. 208 is an OR gate which receives gate signals from G3, G5, G6, and G9; 209, an OR gate which receives gate signals from G1, G4, and G7; The OR gate 208 outputs black information data, and the OR gate 209 outputs white information data.

210 is a counter which receives the output from the OR gate 208, and counts black information data; 211 a counter which receives the output from the gate G8, and counts blue information data; 212, a counter which receives the output from the gate G2, and counts red information data; 213, a counter which receives the output from the OR gate 209, and counts white information data; 214, a judging circuit which receives outputs from the counters 210 through 213, and outputs control signals for color selection. The operation of thus configured circuit is further explained below.

It is assumed that a color on a color document at a first scanning is red. As clearly illustrated in the color extraction map of FIG. 25, the range of red is limited by A' to C' of (VR+VC) signals, and O to E' of (VC/(VR+VC)) signals. Therefore, red signal data must satisfy:

$$A' < VR + VC < C'$$
$$O < VC/(VR+VC) < E'$$

If data within the red range are inputted into the circuit shown in FIG. 24, outputs from each comparator are as follows: 201 is "1"; 202, "1" or "0"; 203, "0"; 204, "1"; 205, "0"; and 206, "0". As a result, each output from the; gate G1, "0"; gate G2, "1"; and gates G3 through G9, "0". Thus, only a signal representing red enters into the counter 212, and is counted.

The above description explains a red data operation. For the rest of the colors, the circuit operates in the same way. That is, for black data, the output from the OR gate 208 turns to "1", and the counter 210 counts the black data; for blue data, the output from the gate G8 turns to "1", and outputs from the other gates turn to "0", for black data, the output from either of the gates G1, G4, or G7 turns to "1", for white data, the output from either of the gate G3, G5, G6, or G9 turns to "1".

Thus, the color data of red picture elements are judged by the position on the color gamut shown in FIG. 25 during the first scanning operation. The number of each picture element positioned on each color gamut is counted by the counters 210 to 213. The judging circuit 214 receives outputs from the counters 210 to 213, judges the number of colors on the document based on the count values, and outputs control signals depending on the judgement. That is, the circuit determines a color to be outputted, decides the color sequence for outputting for the determined color, and controls the scanning operation. The circuit judges whether or not a color exists on the document using the output values from the counters 210, 211, 212, and 213. At this time, the counter output value (CT) is compared with a predetermined threshold value T to decide whether or not a color exists. An example is discussed below.

If $CT_i > T$ where i=blue, black, red, it is determined that the i color exists on the document. If the equation is not satisfied, it is determined that the i color does not exist on the document. The T value may be changed per each color. However, in an actual circuit, it is preferable to decide considering stain (i.e. a small spotted smear such as a fog mark on a white background) on the image that the value may be set around several tens for example. This control signal enters into the B.B.R generating circuit 47 (refer to FIG. 22). As described above, the B.B.R generating circuit 47 receives the control signal, generates B.B.R signals, and gives them to the color select means 45. Thus, the circuit shown in FIG. 22 forms images read by a scanner.

The color counting operations may be executed for all picture elements on a color document, or for discretely sampled elements.

The determination operation of the color number by the color discrimination circuit 46' may be executed by a microcomputer or specially designed hardware. The counters 210 to 213 are not required to have the same maximum count values because the counter for black may require a maximum count value higher than the other colors. In addition, the maximum count value only requires a level that can eliminate noise thereby reducing the manufacturing cost.

In the above description, blue, black and red color are used as the color select signals. However, the present invention is not restricted to them. For instance, Y.M.C series colors may be employed to extract colors on a document. Moreover, the present invention is applicable to an embodiment wherein effective size of one picture element is changed by changing the speed of SUB SCAN so as to become high speed during the first scanning operation. Thus, the color image data outputted from the buffer 43 or 44 are binary- or multiple-coded, and then, reproduced as a color image by an output apparatus.

FIG. 26 is a timing chart showing the operation, wherein the B.B.R signal is black during the first scanning when the color document is composed of black, grey, white, and colors within the red area in the color extraction map. In this figure, 26-a represents the reading timing; 26-b, color discrimination sequence; 26-c, B.B.R signals; and 26-d, recording operation. In a color image processing apparatus, which is configured so that a plurality of optical information, each of which has a specific spectrum characteristic, and each image signal are obtained from a color document; the density data per each color are obtained based on the image signals; and color designation signals make the density data be effective or ineffective. In another embodiment of step 4 in the flowchart shown in FIG. 5, a means may be configured so that the addresses in the memory for threshold value data output are decided using the color designation signals during the multiple-coding operation of the density data. For example, in an image processing apparatus which has the configuration shown in FIG. 22, and employs the color control means shown in FIG. 16, the binary coding operation using the B.B.R signal for designation color is further explained below.

As described above, the B.B.R signals are given to the threshold value ROM 96 as addresses. Assuming the threshold value data is constituted by the 2×2 matrix, the addresses of the threshold value ROM 96 are decided as given in FIG. 27. The predetermined optimum threshold values may be stored in the corresponding addresses. The B.B.R, 2, 3, and CLK in the uppermost line of the table shown in FIG. 27 designate the input terminals of the threshold value ROM 96. The degree of each color density (low, regular, and high) is changed over according to instructions inputted from other unit, for example a control unit (not illustrated in the figure). As clearly shown in FIG. 27, when a B.B.R signal is (0 0), the optimum threshold value matrix group for black color (A0 to A2) is selected. If the color document is to be reproduced with low density, the threshold value matrix A0 is selected. The circuit is configured so that an optimum threshold matrix is selected in the threshold value matrix group B0 to B2 for blue, in the threshold value matrix group C0 to C2 for red color, and in the threshold value matrix D0 to D2 for monochrome. The CLK gives a threshold value address in the threshold value matrix, and selects a threshold value (this function is described below).

The storing method of the threshold value data into the threshold value ROM 96 is as given in FIG. 19. For instance, the threshold value data of 2×2 matrix shown in FIG. 19-a are stored by each numerical datum shown in FIG. 19-c entered into the addresses corresponding to the data shown in FIG. 19-b. When reading out the stored threshold value data, the threshold values of 0→2→3→1 are read in this order. This step is effective during the multiple-coding (more than three-codes) process as well as during the binary-coding process. Changing the relationship between the color designation signal and color output means enables the color conversion. For example, the blue part in the figure can be replaced with red.

Figure 28:
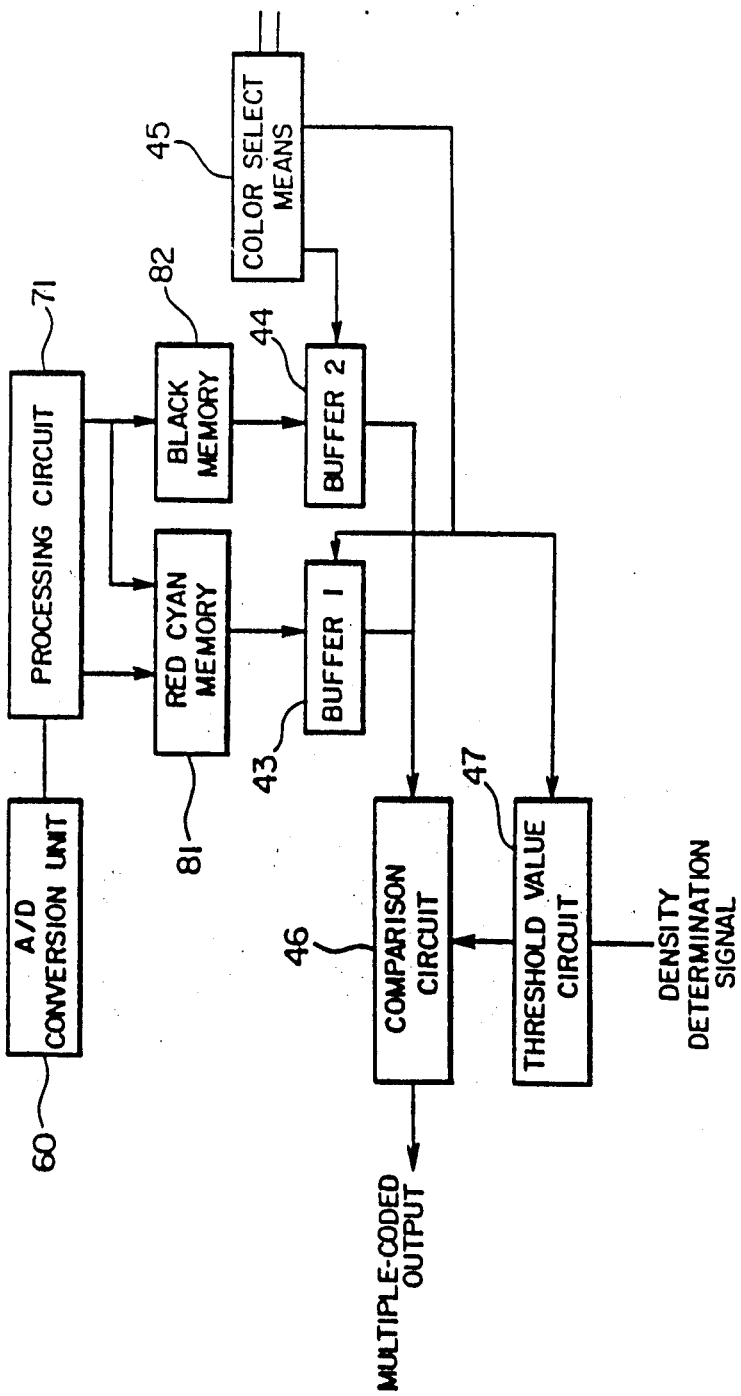
FIGS. 28 and 29 are block diagrams showing modified examples in color extraction and storage means of the present invention.

FIG. 28 is a block diagram showing another embodiment of the present invention, wherein the color extraction information generation means and the color information storage means are integrated. The parts identical to those in FIG. 10 are designated by the same number. The digital image data from the A/D conversion unit 60 enter into the processing circuit 71. The processing circuit 71 receives input image data, calculates VR and VC, and obtains the luminance signal (VR VC) and color difference signal (VC/(VR+VC)). These values directly enter into the memories 81 and 82 as address data.

Figure 29:
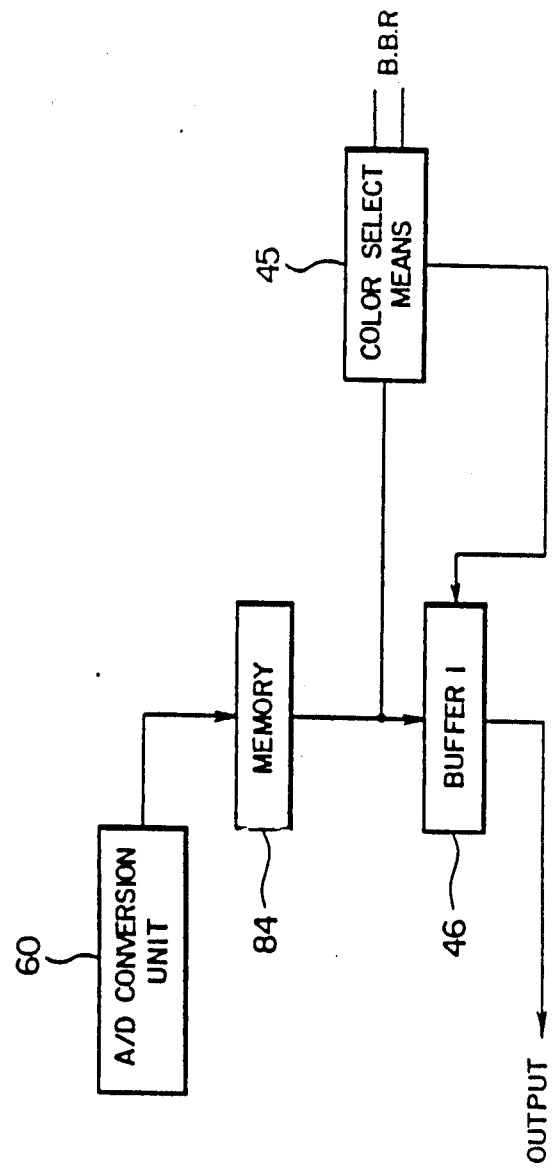

In the above described embodiment, the color extraction information generation means 70 and color information storage means 80 are separated. However, these means may be integrated. FIG. 29 is a block diagram showing another embodiment of the present invention, wherein the color extraction means and color information storage means are integrated. The parts same to those in FIG. 10 are designated the same numbers. The digital image data from the A/D conversion unit 60 enters into the memory 84. Both density corresponding values and color code data are stored in the memory 84. The output from the memory 84, i.e. this code, and color select signal select a color. Thereby data are outputted or no data are outputted from the buffer 46. The following operations are the same as those in FIG. 10, therefore the explanation is omitted. In the above description, the abscissa axis of the color extraction map shown in FIG. 8 is assumed as (VC/(VR+VC)). However, it may be assumed as being (VR/(VR+VC)). Moreover, the similar function may be attained by assuming the abscissa axis as (VR−VC)/(VR+VC) or (VC−VR)/(VR+VC). For instance, assuming the abscissa axis as (VR−VC)/(VR+VC), the result is as follows:

$$(VR - VC)/(VR + VC)$$

= 0 :achromatic colors
\> 0 :red series colors
\< 0 :cyan series colors

In the above description, the spectral characteristic of the employed dichroic mirror is that red series colors transmit it and cyan series colors are reflected by it. However, the present invention is not restricted to it. Any dichroic mirrors may be employed, which can separate colors into two complementary colors as, for example, green and magenta, or blue and yellow. Moreover, the color separation means is not restricted to the dichroic mirrors. Any means which can separate colors as, for instance, spectro-filters may be employed. And the color extraction map is not limited to the T-shaped one shown in FIG. 8. Any type of color extraction map may be used.

Figure 30:
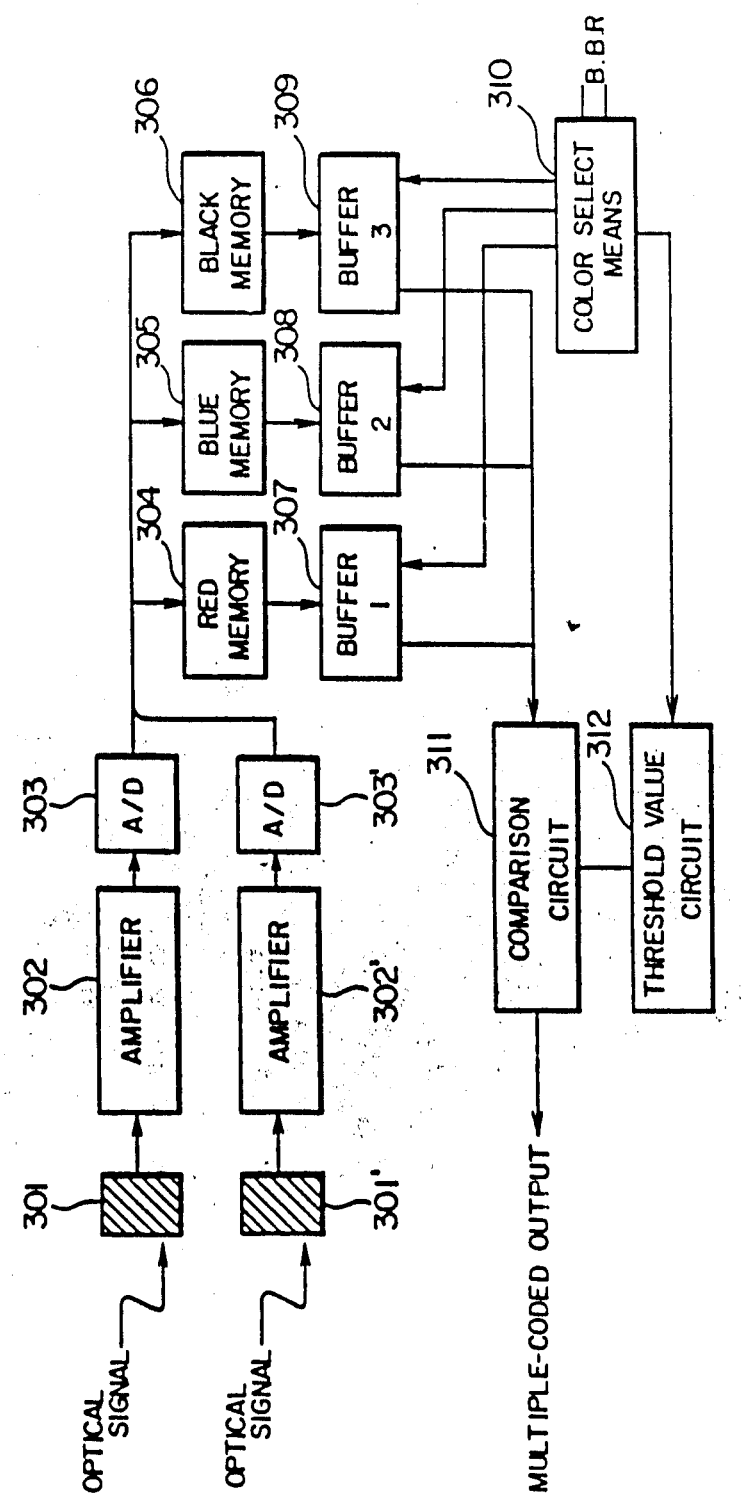
FIGS. 30, 32 and 33 are block diagrams showing another embodiment of the present invention.

Next, an embodiment shown in FIG. 30 is explained. This embodiment extracts colors based on a condition that optical information can be extracted with the color extraction map shown in FIG. 31. The red signal VR and blue signal VB converted to electrical signals by photoelectrical conversion means 301 and 301' are amplified by amplifiers 302 and 302', converted into digital data by A/D converters 303 and 303', and given, as addresses, to a red memory 304, a blue memory 305, and a black memory 306, respectively. The memories 304 through 306 compose a ROM table based on the color extraction map shown in FIG. 31. Image data selected by the B.B.R signals are outputted, enter into the corresponding buffer memories 307 through 309, and are held in them. The output data from the buffer selected by a color select means 310 are multiple-coded by a comparison circuit 311. The threshold value of the comparison circuit 311 is given by a threshold value circuit 312, to which color select signals are given from the color select means 310. Thus, the threshold value circuit 312 generates a threshold value depending on each color gamut. In the explanation above, respective threshold values can be set per one color gamut. To express halftone, a plurality of threshold values may be set instead of employing a fixed threshold value per each color gamut. That is, the threshold value circuit may be configured so that threshold value groups like a dither matrix are set.

Figure 31:
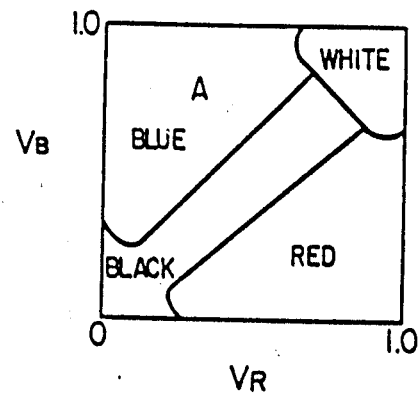
FIG. 31 is a diagram showing an another example of color extraction map.
Figure 33:
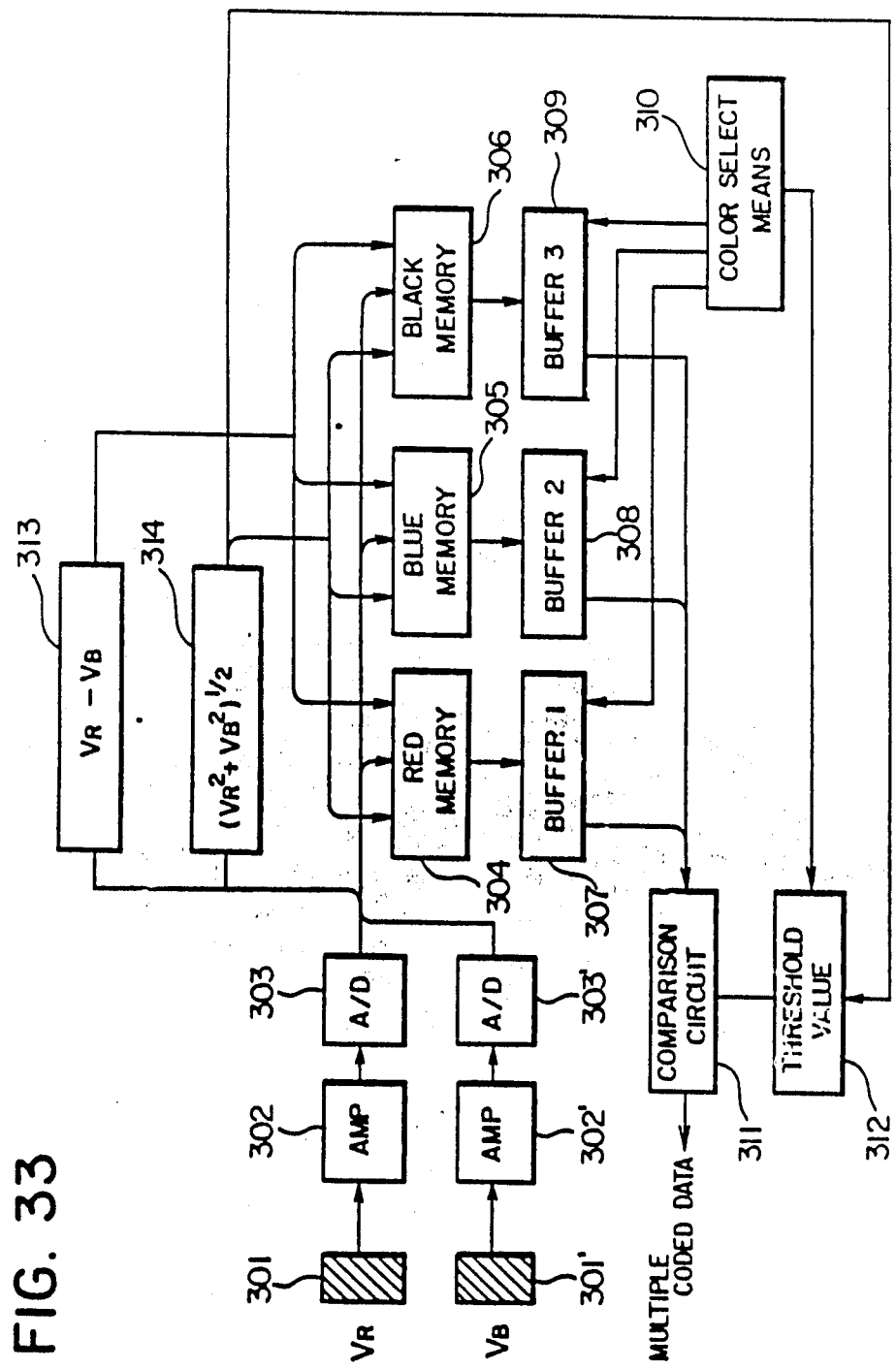

As clearly shown in FIG. 31, if VR of a color is larger than VB, the color is red series. If VB of the color is larger than VR, the color is blue series. Therefore, by comparing the output values of VR and VB of a certain picture element, it can be determined what kind of colors are contained in the image. That is, the + or − sign of result by calculation (VR−VB) can determine a color. 313 shown in FIG. 33 is a subtractor which operates the subtraction of (VR−VB). The output from the subtractor may be used as color control signals for other purposes. Grey level corresponds to this area on the line connecting the two points of (0, 0) and (1, 1) in FIG. 31. To express the A point in FIG. 31 in monochrome, the coordinate of the A point is assumed as (x, y;, and the distance Z, corresponding to a luminance signal value, is given by the relationship $$z = (x^2 + y^2)^{\frac{1}{2}}$$

Figure 32:
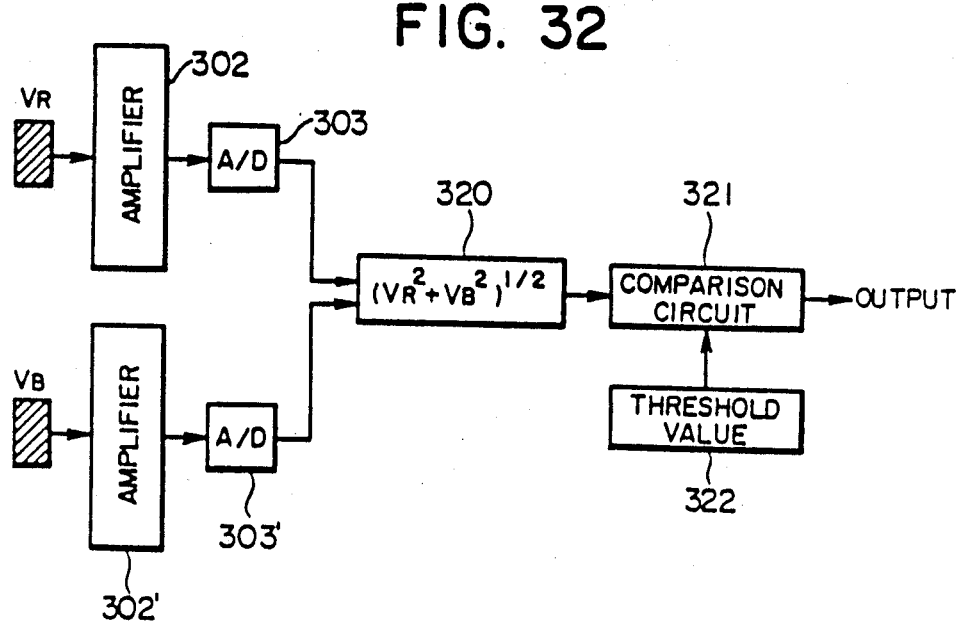

On the other hand, if the Z value can be obtained by processing the output from each A/D converter 303 or 303' with a computing element 320 in FIG. 32, the computed Z value may be assumed as luminance signal data as described above. Therefore, the Z values may be compared with a threshold value from a threshold value circuit 322 in a comparison circuit 321, and thus, may be binary-coded.

Next, an embodiment (shown in FIG. 33) that is a modification of the embodiment shown in FIG. 30 is explained. FIG. 31 has no concept of density for the axes of VR and VB. Therefore, a histogram shown in FIG. 21 cannot be created. However, by permitting a value of $Z = root(VR2 + VB2)$ to correspond to density, and counting the Z value, a histogram can be created. A threshold value can be decided based on the created histogram. Thus, a computing element 314, which obtains the Z value by operating root (VR2+VB2), and a computing element 313, which calculates (VR−VB), are provided. The output from the computing elements 313 and 314 is given, as addresses, to the memories 304 through 306, and the output from the computing element 314 is given to the threshold value circuit 312 as addresses for selecting threshold values. The computing element 313 is provided because a color can be determined, for instance, as red series if VR is larger than VB, and as blue series when VB is larger than VR. Thereby, after deciding threshold values using a density histogram per each color obtained during a preliminary scanning operation, the threshold values may be used for the multiple-coding (including binary-coding) operations during the scanning operations.

Figure 34:
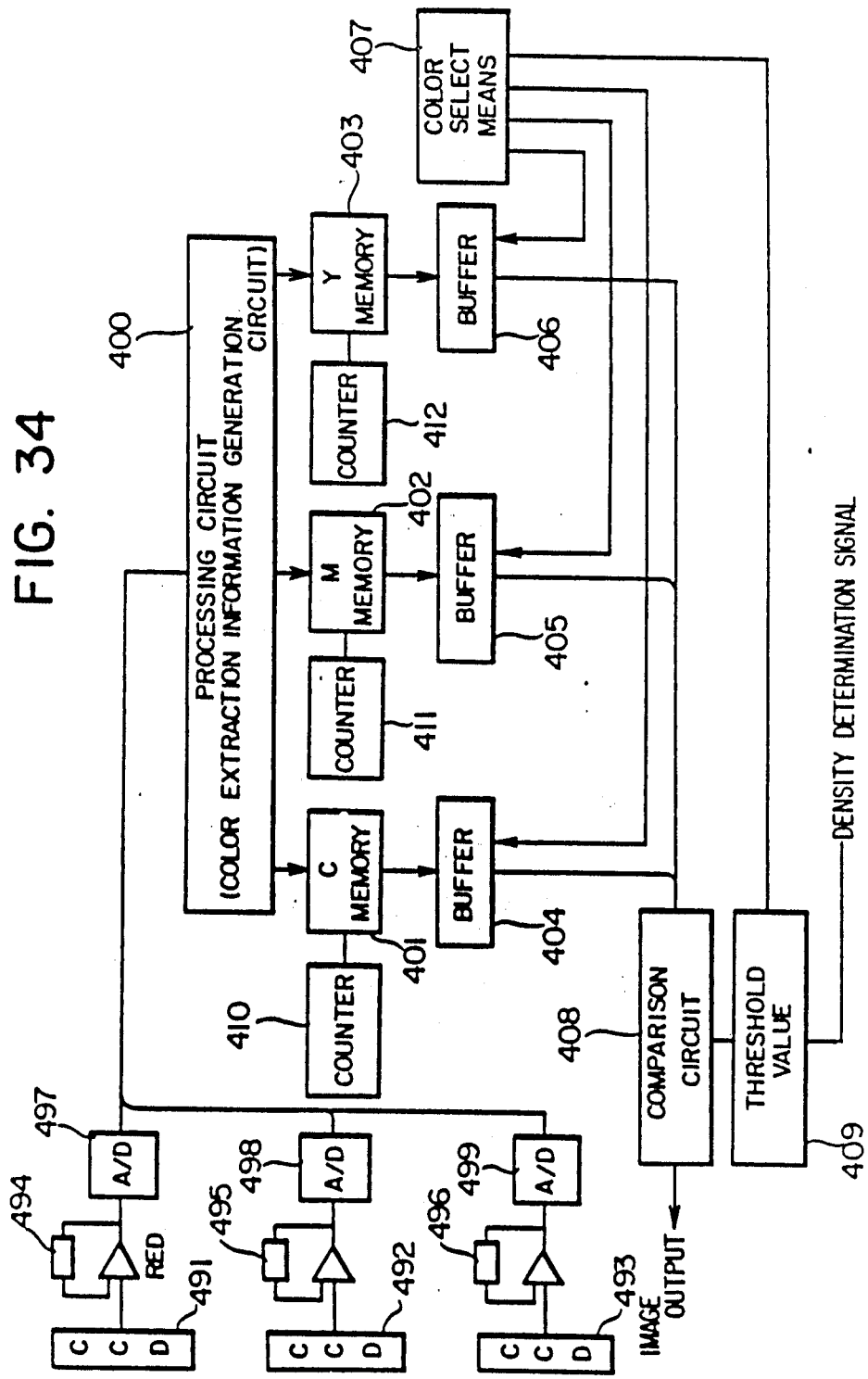
FIGS. 34 and 35 are block diagrams showing another embodiment of the present invention.

In the above description, three series of red, blue, and black are employed as the color gamut. However, the present invention is not restricted to these series. For instance, three series of cyan, magenta, and yellow may be used. FIG. 34 is a block diagram showing another embodiment of the present invention. Optical information separated into red, green, and blue series colors by an optical system (not shown in the figure) is photoelectrically converted to electrical signals by per each series by CCDs 491 through 493. The photoelectrically converted signals are amplified to a predetermined level by the following amplifiers 404 through 496, and converted to digital data in A/D converters 497 through 499. The output from the A/D converters 497 through 499 enters into a processing circuit (color extraction information generation circuit) 400, and is processed with a predetermined arithmetic operation. On the other hand, density corresponding values of cyan, density corresponding values of magenta, and density corresponding values of yellow, are stored per each color gamut in the memories 401, 402, and 403, respectively. The processing circuit 400 receives input data of R, G, and B, and converts them to select density corresponding values of cyan, magenta, and yellow. The converted data are given to the memories 401 through 403 as addresses. The memories 401 through 403 output density corresponding values stored in the given addresses. The outputted density corresponding values are held temporarily in the buffers 404 through 406. A color select means 407 receives RGB selects signals, and select one buffer from the buffers 404 through 406. The output from the selected buffer enters into the comparison circuit 408, is compared to the threshold value given from the threshold value circuit 409, and is multiple-coded (including binary-coded). The multiple-code output is the output of the apparatus shown in the figure. Into the threshold value circuit 409, color select signals from the color select means 407 and density determination signals are inputted. Thereby the threshold value circuit 409 can output an optimum threshold value. By integrating a color extraction information generation circuit to the processing circuit 400, and by monitoring whether or not the color extraction information generation circuit 400 indicates a color corresponding to document image to the memories 401 through 403 in which each color data of YM and C are stored during document scanning operation, it can be determined what colors are involved in the document. 410 through 412 are counters which count the number of indications of corresponding color to the memories 401 through 403. Color control signals can be obtained from the counted values of these counters. Further, according to this embodiment, a density corresponding value can be obtained in the similar manner to the color extraction map shown in FIG. 2.

Figure 35:
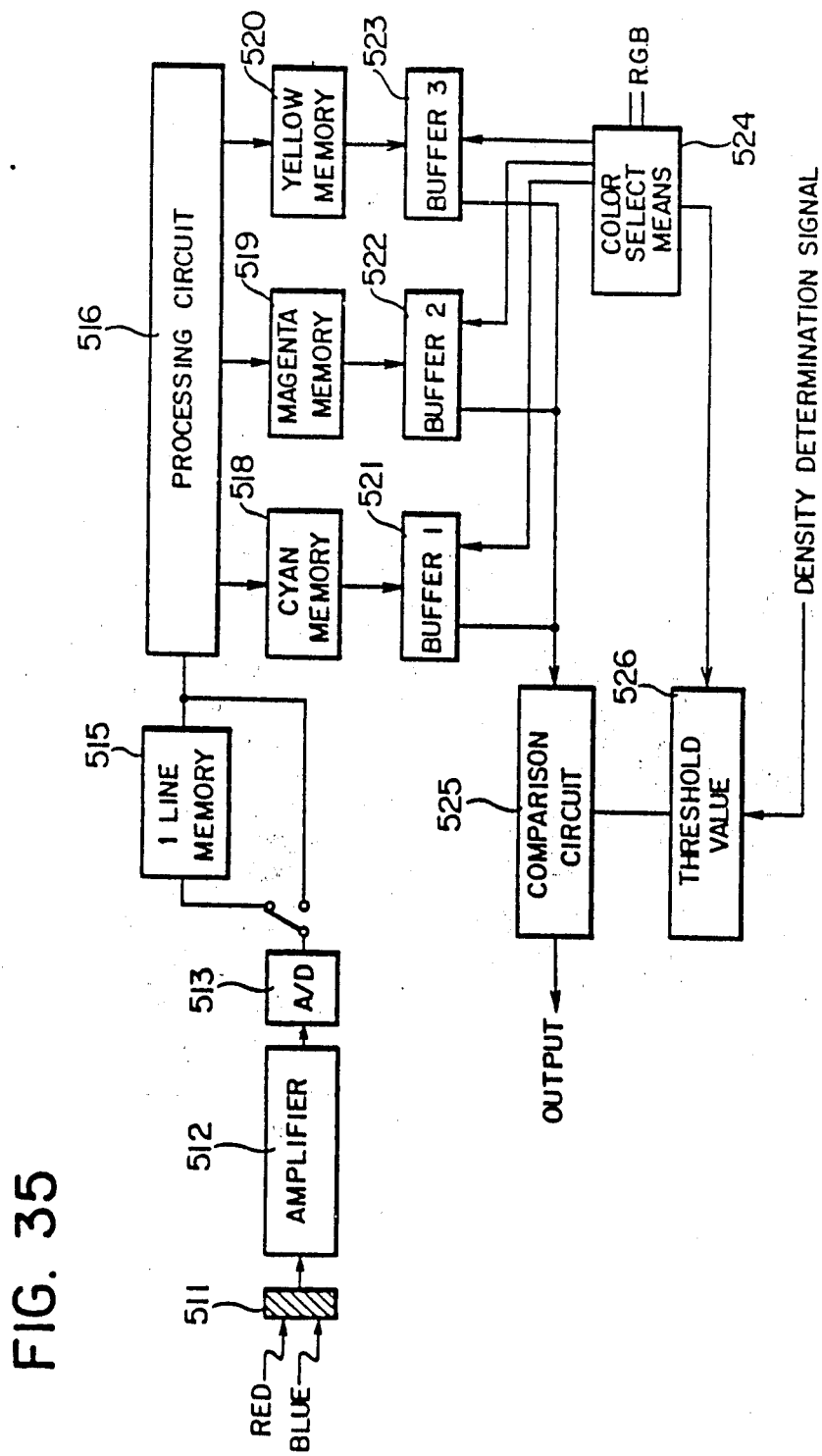

The embodiment shown in FIG. 35 is configured so that it outputs density corresponding values per each color gamut as the same to the embodiment shown in FIG. 34. By sequentially using red and blue illumination, the optical information separated into red and blue series are converted into electrical signals in a photoelectrical conversion element 511, and amplified to a predetermined level by a following amplifier 512. The amplified image signals enter into an A/D converter 513, and are converted into digital data. The output VR and VB from the A/D converter 513 enter into a processing circuit 516 synchronized by a selector 514 and a line memory 515 to be, thereby, operated by predetermined arithmetical processing. On the other hand, density corresponding values of cyan, density corresponding values of magenta, and density corresponding values of yellow are stored per each color gamut in memories 518, 519, and 520, respectively. Therefore, the processing circuit 517 receives the input data of VR and VB, and converts them to select density corresponding values of C, M, and Y. The converted data are given to the memories 518 through 520 as addresses. The memories 518 through 520 output density corresponding values stored in the corresponding addresses. The outputted density corresponding values are held in buffers 521 through 523 temporarily. The color select means 524 selects one buffer from the buffers 521 through 523. The output from the selected buffer enters into a comparison circuit 525, is compared with the threshold value given from the threshold value circuit 526, and multiple-coded (including binary-coded). The multiple-coded output is the output of the apparatus shown in the figure. The color select signals from the color select means 524 and density determination signals are inputted into the threshold value circuit 526 as described above. Thereby, the threshold value circuit 526 outputs optimum threshold values.

Figure 3:
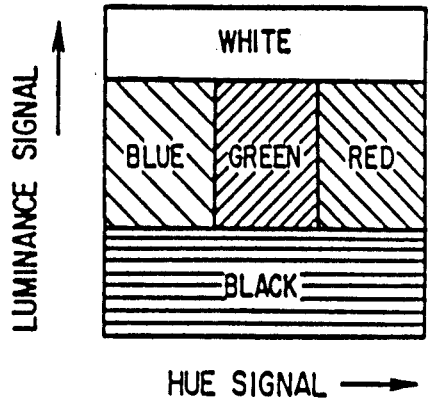
Figure 36:
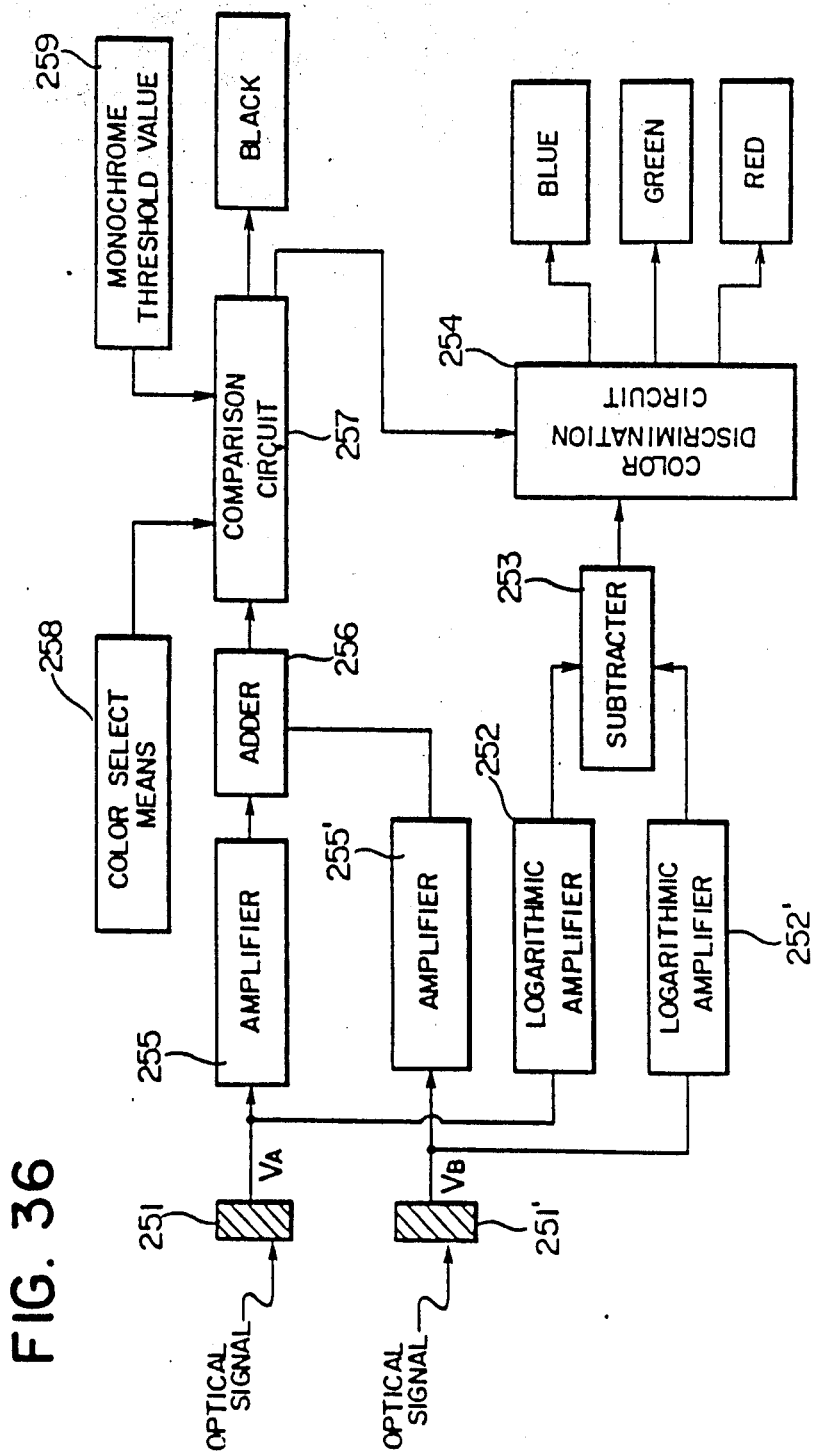
FIGS. 36, 37, 38 and 39 are block diagrams showing another embodiment utilizing the color extraction map shown in FIG. 3.

FIG. 36 is a block diagram showing an application of the present invention. The apparatus shown in this figure separates colors on a document into three elementary colors of red, green, and blue based on the color extraction map shown in FIG. 3. In FIG. 3, the abscissa axis represents hue signal, and the ordinate axis represents luminance signal. Two kinds of optical signals are converted to electrical signals VA and VB by photoelectrical conversion means 251 and 251' like CCDs. The converted electrical signals are inputted into logarithmic amplifiers 252 and 252', and logarithmically amplified. The logarithmically amplified signals log VA and log VB are subjected to the processing of (log VA − log VB) in the following subtractor 253. For this value of (log VA - log VB), the following color discrimination circuit 254 determines as follows:

log $V_A$ − log $V_B$ > $b1$    is red series color,
$b2$ < log $V_A$ − log $V_B$ < $b1$    is green series color,
log $V_A$ − log $V_B$ < $b2$    is blue series color, thereby outputting color signals of red, green and blue. On the other hand, VA and VB signals are amplified by the amplifiers 255 and 255,, then subjected to processing of (VA+VB) in an adder 256. The add value (VA+VB) of VA and VB represents luminance signal as the same to the embodiment shown in FIG. 10. The luminance signals are used as image data for multiple-coding operation That is, the output from the adder 256 enters into a comparison circuit 257. The color select signals from the color select means 258 and threshold value data from a monochrome threshold value circuit 259 that generates monochrome threshold values are inputted into the comparison circuit 257. When monochrome signals are outputted from the color select means 258, the output (luminance signals) from the adder 256 are multiple-coded by the threshold values from the threshold value circuit 259. In the mode other than monochrome mode, the circuit determines, by the threshold values outputted from the threshold value circuit 259 that generates threshold values for achromatic colors, as follows:

$V_A + V_B > a1$    is white,
$a2 < V_A + V_B < a1$    is chromatic colors,
$V_A + V_B < a2$    is black.

The output from the comparison circuit 257 is inputted into the color discrimination circuit 254 in order to permit the color discrimination circuit 254 to know that $a2 < V_A + V_b < a1$ is chromatic color.

Figure 37:
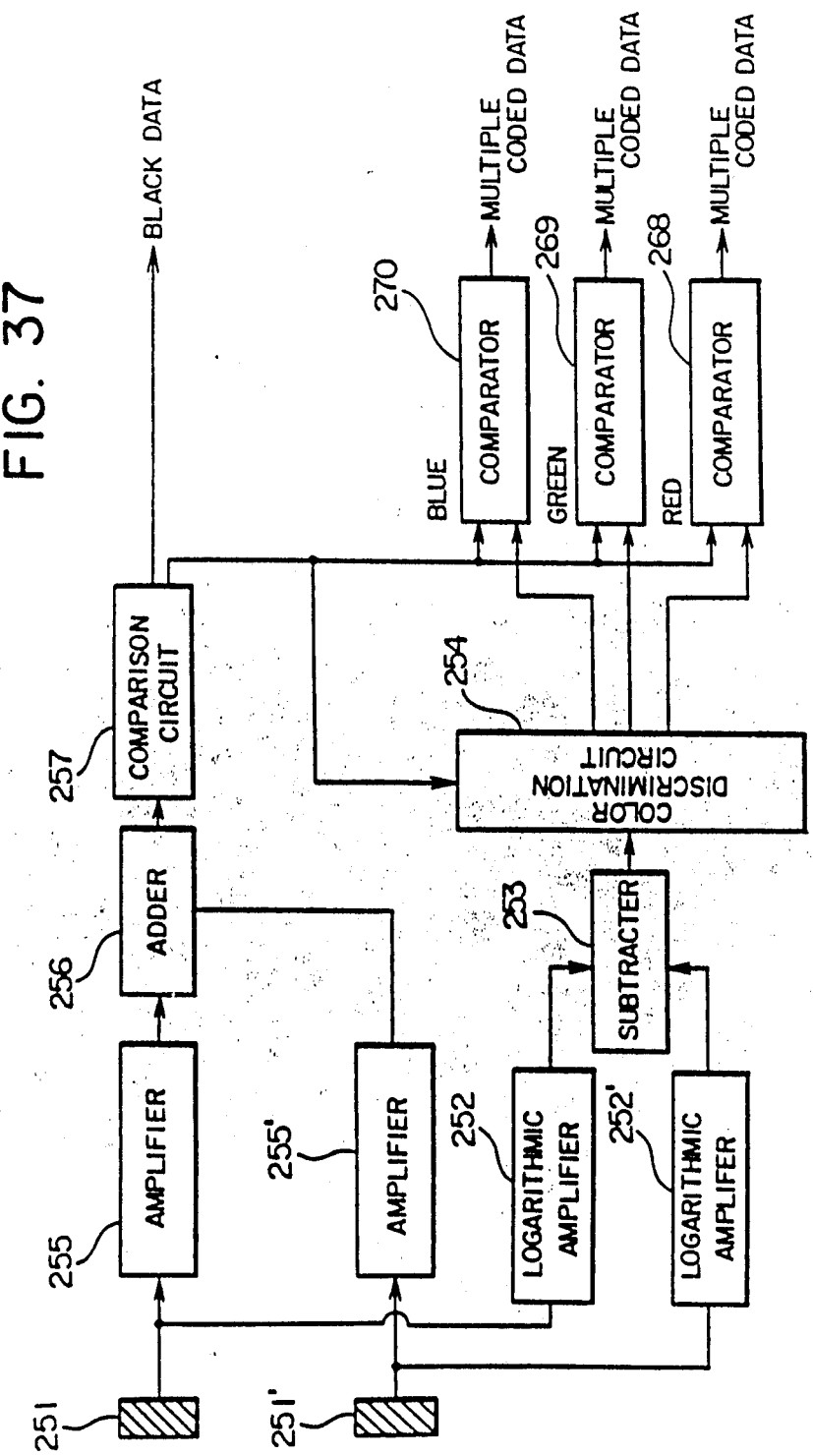

FIG. 37 is a block diagram showing another embodiment of the present invention. The embodiment is configured by modifying the embodiment shown in FIG. 30 so that density of a color on a document is known by creating the (VA+VB) density histograms of blue, green, and red to be the same as the embodiment shown in FIG. 14. Therefore, the threshold values can be decided per each color gamut. That is, by providing to the comparison circuit 257 the density histogram and threshold value creating functions, the threshold values created per each color gamut are given, as reference values, from the comparison circuit 257 to each comparator 268 through 270. Thereby, the image data outputted from the color discrimination circuit 256 are multiple-coded.

Figure 38:
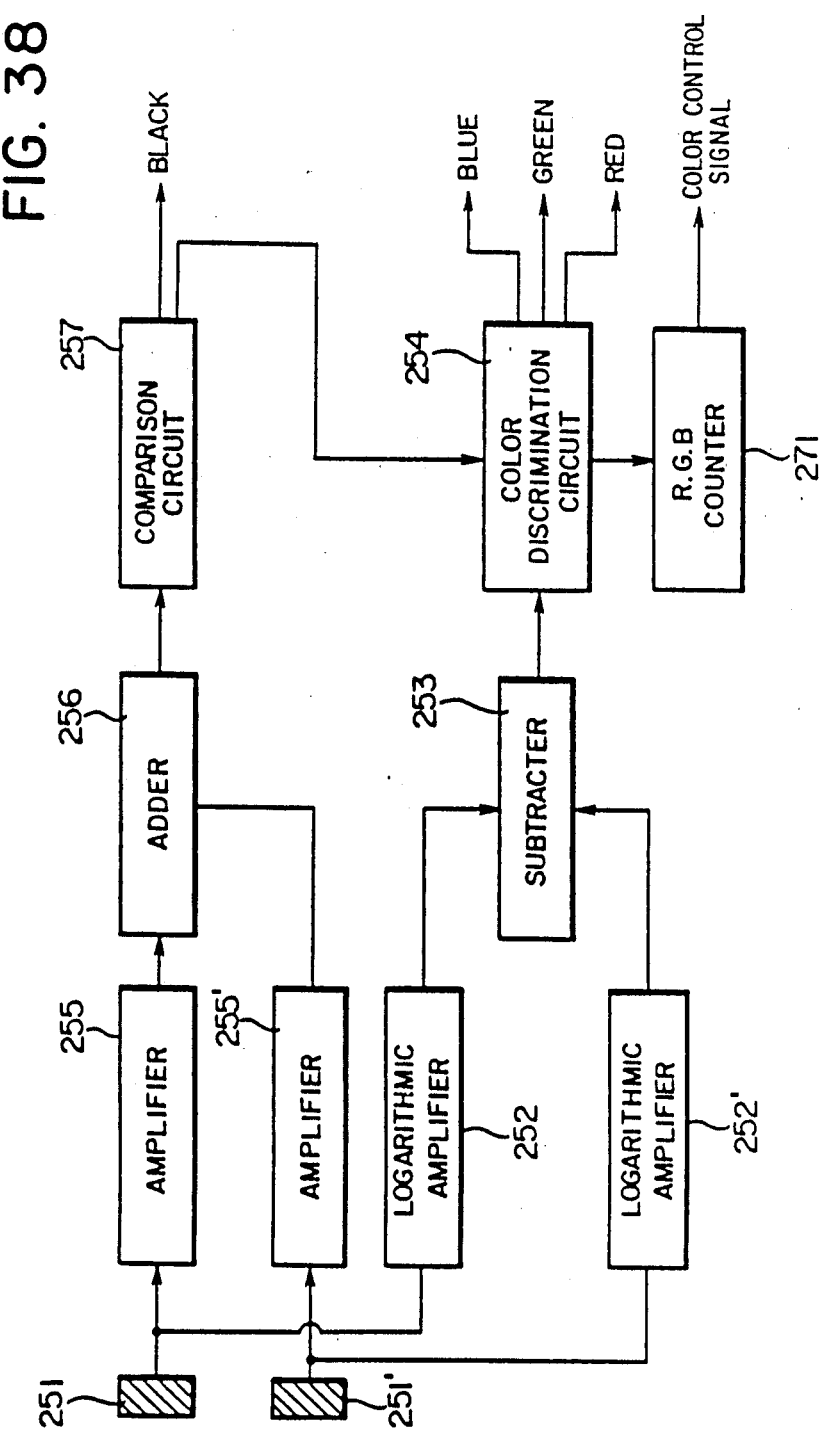
Figure 39:
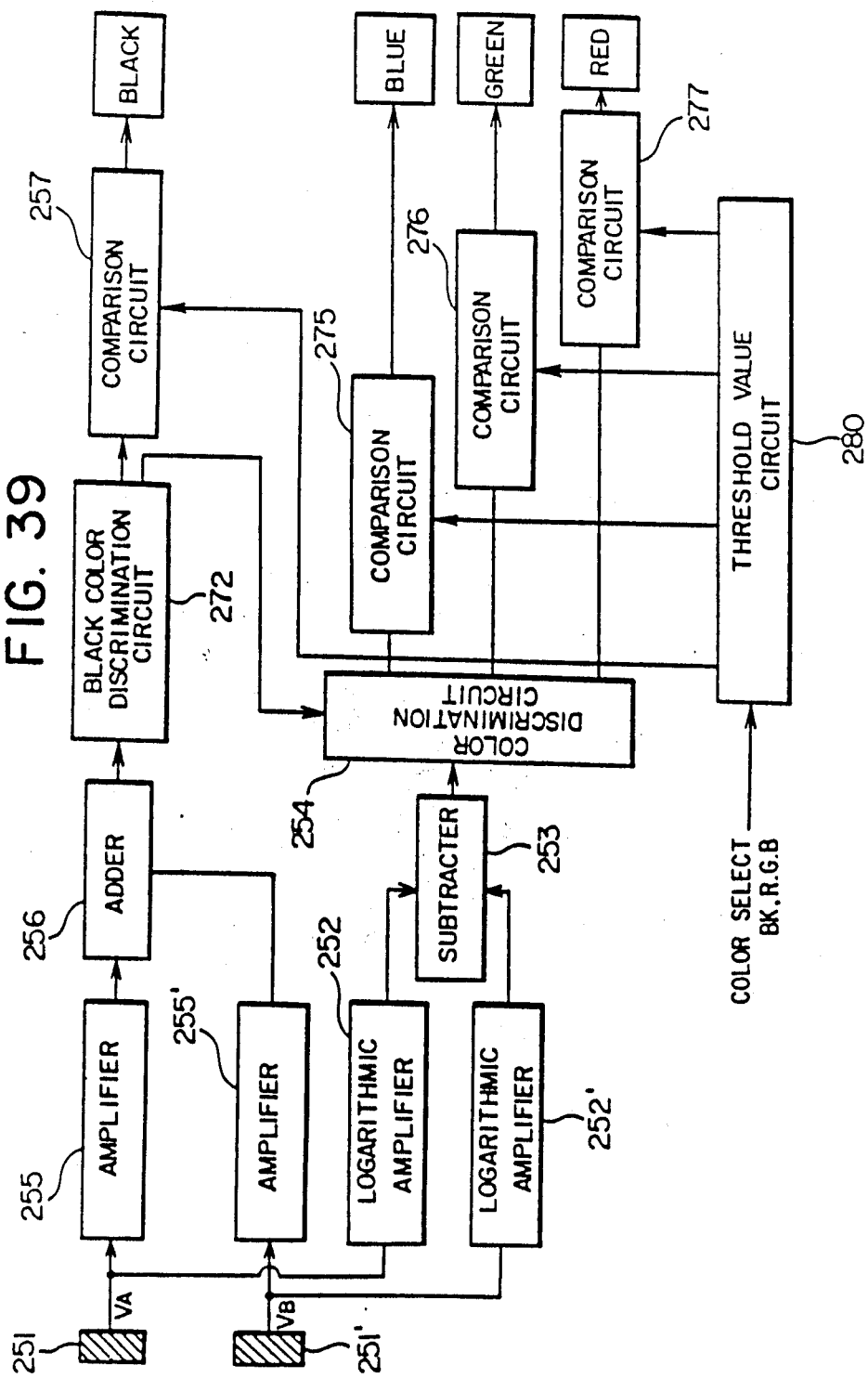

The embodiment shown in FIG. 38 is also a modification of the embodiment shown in FIG. 36. In this embodiment, the output from the color discrimination circuit 254 is also inputted into a RGB counter 271. If a color document contains a lot of colors, the value of (log VA − log VB) varies within a wide range during a scanning operation. Assuming that the value of (log VA − log VB) is quantized as 5 bit (32 levels), it is known what color is contained in the document by monitoring which bit turns to "1". The RGB counter 271 monitors the bit signals, determines the kind of colors, and outputs color control signals. Furthermore, the embodiment shown in FIG. 39 is also a modification of the embodiment shown in FIG. 36. In this embodiment, the operated output from an adder 256 is determined by a black color discrimination circuit 272 as follows:

$V_A + V_B > a1$    is white,
$a2 < V_{KA} + V_B < a1$    is chromatic colors,
$V_A + V_B < a2$    is black.

The output from the black color discrimination circuit 272 is inputted into the color discrimination circuit 254 in order to permit the color discrimination circuit 254 to know that $a2 < V_A + V_B < a1$ is a chromatic color. The color data and density data based on the determination results by the color discrimination circuit 254 enter into each comparator 275, 276, and 277 which is equipped per each color, and are multiple-coded (including binary-coded) by the threshold values that are set per each color gamut separately. As the same way, black color is also multiple-coded (binary-coded) by the threshold value separately set by the comparison circuit 257. These threshold values per each color gamut are given by the threshold value circuit 280 which generates respective threshold value per each color gamut.

Figure 40:
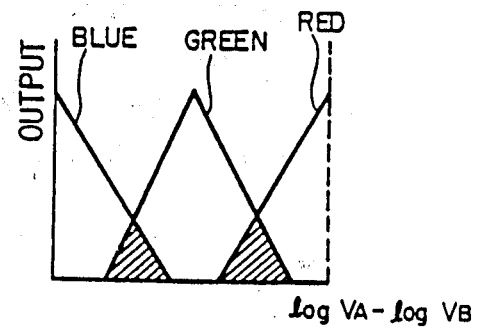
FIG. 40 is a diagram showing an output characteristic of the embodiment shown in FIGS. 36 to 39.

Since in the embodiments described in FIGS. 36 through 39, the values of (log VA−log VA) represent the hue of approx. blue through red. Halftone colors may be expressed by employing the output characteristics shown in FIG. 40. In this figure, the abscissa axis represents (log VA−log VB), and the ordinate axis represents the density output. ROM's, which store density corresponding values having the characteristics shown in the figure, may be provided for each color of RGB. The area shown by diagonal lines in the figure represents the area expressing halftone colors.

Figure 41:
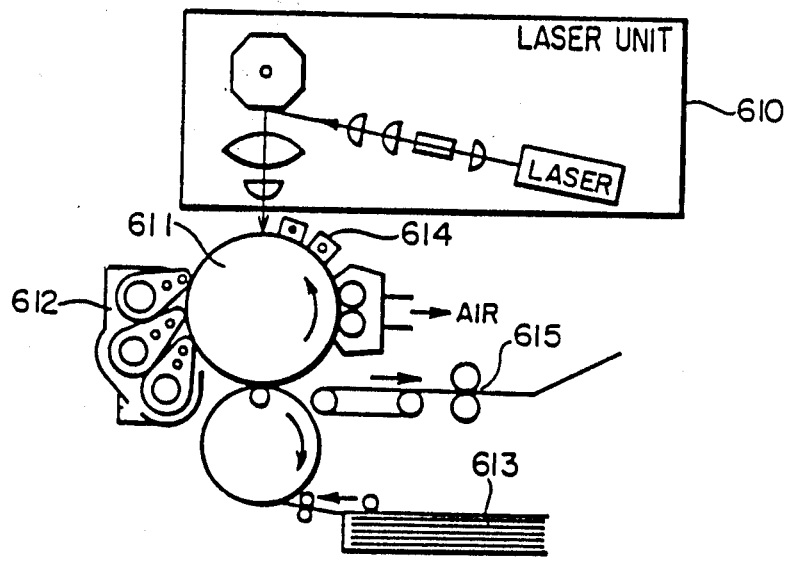

FIGS. 41 through 44 illustrate various configurations of output apparatus. FIGS. 41, 42, 43, and 44 illustrate a laser printer, thermal transfer printer, optical fiber tube recording apparatus, and bubble jet color printer, respectively. Further, the operation of the laser printer shown in FIG. 41 is explained. In the color mode, a laser unit 610 injects modulation light modulated by the density data of red color that is selected by the B.B.R signals. The injected modulation light exposes the surface of a photoconductor drum 611. First, red toner is adhered to the exposed photoconductor drum 611 by a developing unit 612, where only a red developer functions, then is transferred onto a copying paper fed from a paper feed cassette 613. Next, the photoconductor drum 611 rotates one turn, receives initial charging at an initial charging unit 614, then the laser unit 610 injects modulation light modulated by the blue density data selected by the B.B.R signals. The injected modulation light exposes the surface of the photoconductor drum 611. Onto the photoconductor drum 611, blue toner is adhered by the developing unit 612, in which only a blue developer functions at this time. The blue toner adhered to the photoconductor drum 611 is transferred onto the same copying paper. The photoconductor drum 611 rotates one more turn, receives initial charging at the initial charging unit 614, then the laser unit 610 injects modulation light modulated by the black density data selected by the B.B.R signals. The injected modulation light exposes the surface of the photoconductor drum 611. Onto the photoconductor drum 611, black toner is adhered by the developing unit 612, in which only a black developer functions at this time. The black toner adhered to the photodrum 611 is transferred onto the same copying paper. The copying paper transfer-printed with predetermined colors is fed to a fixing unit 615 and is fixed as a color image. In a monochrome mode, the laser unit injects modulation light modulated by the data as, for instance, from the third buffer 45 which is selected by the B.B.R signals as described in the embodiment shown in FIG. 13. The injected modulation light exposes the surface of the photoconductor drum 611. Onto the photoconductor drum 611, black toner is adhered by the developing unit 612, in which only a black developer functions at this time. The black toner adhered to the photoconductor drum 611 is transferred onto a copying paper fed from the paper feed cassette 613. The copying paper transfer-printed with black toner is fed to the fixing unit 615 and is fixed as a color image.

The operation of the thermal transfer printer shown in FIG. 42 is described as follows. In this printer, an ink ribbon 621 on which 4 colors of Y (yellow), M (magenta), C (cyan), and B (black) are adhered continuously, moves in the arrow direction shown in the figure. A copying paper 623 fed from a paper feed cassette 622 is fed to a platen 624. Each color toner on the ink ribbon 621, which is melted by a thermal head 625, is transfer-printed onto the copying paper 623. The transfer-printed copying paper 623 is fed out.

Next, the operation of the optical fiber tube recording apparatus shown in FIG. 43 is explained. Image information displayed on a CRT 631 is converged by a lens 632, reflected by a mirror 633, and enters into a photosensitive member 634, and exposes it. The exposed photosensitive member 634 is fed to a developing unit 635, is developed by each developer of cyan, magenta, and yellow. The developed member 634 is also fed to a transfer-printing unit 636. A copying paper 627 is fixed in a fixing unit (not shown in the figure), and fed out.

Finally, the operation of the bubble jet color printer shown in FIG. 44 is described. A bubble jet head 642 is mounted on a head feed table 641. To the bubble jet head 642, each color ink is fed from an ink tank 643 of Y (yellow), M (magenta), C (cyan), and BLK (black). Onto a recording paper 644, each color bubble is injected and a color image is completed.

What is claimed is:

1. A color image processing apparatus comprising:
    optical means for obtaining optical color information corresponding to a plurality of colors of an original color image,
    photoelectric conversion means for converting said optical color information into respective electric signals,
    color extraction means for extracting color information signals from said electric signals,
    selecting means for generating selection signals to sequentially select said extracted color information signals,
    control means for outputting selected color information signals based on said extracted color information signals and said selection signals, and
    multiple coding means for coding said outputted selected color information signals into multiple coded signals by comparing said outputted selected color information signals with a threshold value,
    wherein said control means includes means for providing a luminance signal obtained from said color extraction means and for inputting the luminance signal to said multiple coding means in response to a monochrome code selection signal from said selecting means to enable said original color image to be reproduced as a monochrome image.

2. The color image processing apparatus of claim 1, wherein said color extraction means comprises
    color information storage means for storing predetermined color extraction data.

3. The color image processing apparatus of claim 1, wherein said color extraction means comprises
    color extraction information signal generation means for generating color extraction information signals from said electric signals; and
    color information storage means for storing predetermined color extraction data.

4. A color image processing apparatus comprising:

optical means for obtaining optical color information corresponding to a plurality of colors of an original color image, photoelectric conversion means for converting said optical color information into respective electric signals, color extraction means for extracting color information signals from said electric signals, selecting means for generating selection signals to sequentially select said extracted color information signals, control means for outputting selected color information signals based on said extracted color information signals and said selection signals, multiple coding means for coding said outputted selected color information signals into multiple coded signals by comparing said outputted selected color information signals with a threshold value, and threshold means for providing an individual set of threshold values for each of said plurality of colors.

5. The color image processing apparatus of claim 4, wherein said threshold means comprises a threshold value storage means for storing said individualized set of threshold values.

6. The image processing apparatus of claim 5, wherein said threshold value storage means is addressed by said selection signals.

7. A color image processing apparatus comprising:
optical means for obtaining optical color information corresponding to a plurality of colors of an original color image;

photoelectric conversion means for converting said optical color information into respective electric signals, color extraction means for extracting color information signals from said electric signals, selecting means for generating selection signals to sequentially select extracted color information signals, control means for outputting selected color information signals based on said extracted color information signals and said selection signals, and multiple coding means for coding said outputted selected color information signals into multiple coded signals by comparing said outputted selected color information signals with a threshold value.

8. A color image processing apparatus comprising:
optical means for scanning a document having color image information and obtaining optical signals therefrom corresponding to a plurality of colors of said document, photoelectric conversion means for converting said optical signals into respective electric signals, color extraction means for extracting color information signals from said electric signals, selecting means for generating selection signals to sequentially select said extracted color information signals, control means for outputting selected color information signals based on said extracted color information signals and said selection signals, multiple coding means for coding said outputted selected color information signals into multiple coded signals by comparing said outputted selected color information signals with a threshold value, and means for obtaining color gamut information and color density information of said color gamut from said multiple coded signals during a first scan of said document.

9. The apparatus of claim 8, further comprising means for judging a required number of scans for said document based on both said color gamut information and said density information.

10. The apparatus of claim 8, wherein said first scan is a preliminary scanning.

11. The apparatus of claim 8, wherein said first scan is a scan for a first color of said plurality of colors.

12. The apparatus of claim 8, further comprising means for judging threshold value for multiple coding based on both said color gamut information and said color density information.

13. A method of processing a color image, which comprises the steps of:
(1) scanning an original color image and providing therefrom optical color information corresponding to a plurality of colors of an original color image,
(2) photoelectrically converting the optical color information into electric signals,
(3) generating color extraction signals from said electric signals,
(4) addressing a color information storing means with the color extraction signal, the color information storing means storing density corresponding data corresponding to a plurality of predetermined color gamuts on a color map,
(5) selecting an addressed density corresponding data in accordance with a color selection signal which designates a selected one of said plurality of predetermined color gamuts, and
(6) coding the selected density corresponding data of the designated color gamut by comparing it with a threshold value.

14. The method of claim 13, further comprising the step of discriminating a color gamut existing on said original color image.

15. The method of claim 14, further comprising the step of determining a threshold value corresponding to a density information of the existing color gamut.

16. The method of claim 13, further comprising the steps of preliminary scanning the original color image for discriminating a color gamut from among a plurality of color gamuts existing thereon, determining threshold values for each of the plurality of existing color gamuts, generating color selection signals to repeat steps (1) to (6) as many times as the number of the plurality of existing color gamuts, and performing said coding step by coding the selected density corresponding data with said determined threshold values.

17. The method of claim 16, wherein said discriminating step comprises discriminating the existing color gamut on the basis of a density histogram.

18. The method of claim 13, wherein the original color image is comprised of a plurality of picture elements, comprising the steps of first carrying out steps (1) to (6) for a specific color gamut, discriminating a color gamut from the plurality of color gamuts existing on said original color image by counting the number of picture elements belonging to each of said plurality of color gamuts, and comparing the counted values with predetermined values to determine a number of color gamuts to be processed from said plurality of color gamuts, and controlling said color selection signal to repeat steps (1) to (6) for said number of color gamuts.

19. A method of processing a color image, which comprises the steps of:
(1) scanning an original color image and providing therefrom optical color information corresponding to a plurality of colors of an original color image,
(2) photoelectrically converting the optical color information into electric signals,
(3) generating color extraction signals from said electric signals,
(4) addressing a color information storing means with the color extraction signal, the color information storing means storing density corresponding data corresponding to a predetermined color gamut on a color map,
(5) selecting an addressed density corresponding data in accordance with a color selection signal which designates a color gamut, and
(6) in a monochromatic mode which expresses all color images by one specific color, and with said color extraction signals comprising a color difference signal and a luminance signal, coding the luminance signal by comparing it with a threshold value.

* * * * *